United States Patent
Gyori et al.

(10) Patent No.: US 10,001,402 B1
(45) Date of Patent: Jun. 19, 2018

(54) INSTRUMENTED ITEM STOWAGE SYSTEM WITH MODULAR ELEMENTS

(71) Applicant: AMAZON TECHNOLOGIES, INC., Seattle, WA (US)

(72) Inventors: Benjamin Jozef Gyori, Seattle, WA (US); Ismael Medrano, Seattle, WA (US); Alexander Michael Frenkel, Seattle, WA (US); Punit Narendra Java, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 69 days.

(21) Appl. No.: 14/745,045

(22) Filed: Jun. 19, 2015

(51) Int. Cl.
*G06Q 10/08* (2012.01)
*G01G 21/22* (2006.01)
*G01G 21/28* (2006.01)

(52) U.S. Cl.
CPC ............ *G01G 21/22* (2013.01); *G01G 21/28* (2013.01); *G06Q 10/087* (2013.01)

(58) Field of Classification Search
CPC .............. G06Q 10/087; G01G 21/22; G01G 21/28–21/286
See application file for complete search history.

(56) References Cited

U.S. PATENT DOCUMENTS

| | | | | |
|---|---|---|---|---|
| 4,120,371 A * | 10/1978 | Zohn | ............ | G01G 21/22 177/262 |
| 4,274,500 A * | 6/1981 | Kuhnle | ............ | G01G 19/4144 177/126 |
| 4,351,403 A * | 9/1982 | Ferguson | ............ | G01G 23/38 177/128 |
| 5,235,141 A * | 8/1993 | Lida | ............ | G01G 21/23 177/255 |
| 5,496,972 A * | 3/1996 | Demar | ............ | G01G 21/00 177/262 |
| 5,671,362 A * | 9/1997 | Cowe | ............ | G06Q 10/087 340/5.92 |
| 5,881,910 A | 3/1999 | Rein | | |
| 6,382,431 B1 | 5/2002 | Burke | | |
| 6,590,166 B2 * | 7/2003 | Yoshida | ............ | A61B 5/0537 177/126 |
| 6,639,156 B2 * | 10/2003 | Luke | ............ | G06Q 10/087 177/199 |
| 6,769,552 B1 | 8/2004 | Thalenfeld | | |

(Continued)

OTHER PUBLICATIONS

Johnson, Sonji N., "Final Office Action dated Dec. 15, 2016", U.S. Appl. No. 14/745,187, The United States Patent and Trademark Office, Dec. 15, 2016.

(Continued)

*Primary Examiner* — Randy Gibson
(74) *Attorney, Agent, or Firm* — Lindauer Law, PLLC

(57) ABSTRACT

Inventory locations such as shelves in a materials handling facility may be used to store items of various shapes and sizes. Described is a modular item stowage system with hardware that incorporates several components that may be readily reconfigured to accommodate changes in store layout, product presentation, and so forth. The components may include one or more of an instrumented auto-facing unit, divider, spacer, and so forth. The hardware may also support onboard electronics such as sensors to acquire sensor data and computing devices to process the sensor data.

21 Claims, 10 Drawing Sheets

(56) References Cited

U.S. PATENT DOCUMENTS

| | | | |
|---|---|---|---|
| 6,889,854 B2 | 5/2005 | Burke | |
| 6,998,543 B2* | 2/2006 | Sugrue | G01G 21/22 177/126 |
| 7,063,217 B2 | 6/2006 | Burke | |
| 7,225,980 B2 | 6/2007 | Ku et al. | |
| 7,256,357 B1* | 8/2007 | Kesselman | G01G 19/005 177/25.15 |
| 7,683,272 B2* | 3/2010 | Hong | G01G 19/445 177/126 |
| 7,949,568 B2 | 5/2011 | Fano et al. | |
| 8,009,864 B2 | 8/2011 | Linaker et al. | |
| 8,175,746 B2* | 5/2012 | Godlewski | A61J 7/0069 700/236 |
| 8,189,855 B2 | 5/2012 | Opalach et al. | |
| 8,630,924 B2 | 1/2014 | Groenevelt et al. | |
| 8,695,878 B2 | 4/2014 | Burnside et al. | |
| 9,235,928 B2 | 1/2016 | Medioni et al. | |
| 9,557,209 B2* | 1/2017 | Savage | G01G 21/22 |
| 2001/0008984 A1 | 7/2001 | Omura et al. | |
| 2004/0004047 A1 | 1/2004 | Nagel et al. | |
| 2004/0065631 A1 | 4/2004 | Nagel | |
| 2005/0072747 A1 | 4/2005 | Roslof et al. | |
| 2008/0186167 A1 | 8/2008 | Ramachandra | |
| 2009/0205876 A1* | 8/2009 | Claypool | G01G 21/22 177/25.13 |
| 2009/0248198 A1 | 10/2009 | Siegel et al. | |
| 2010/0318440 A1* | 12/2010 | Coveley | G01G 19/40 705/26.1 |
| 2011/0011936 A1 | 1/2011 | Morandi et al. | |
| 2012/0193247 A1* | 8/2012 | Fleet | G01G 19/52 206/215 |
| 2012/0284132 A1 | 11/2012 | Kim et al. | |
| 2013/0284806 A1 | 10/2013 | Margalit | |
| 2014/0201041 A1* | 7/2014 | Meyer | G06Q 10/087 705/28 |
| 2014/0319086 A1 | 10/2014 | Sosso et al. | |
| 2016/0048798 A1* | 2/2016 | Meyer | G06Q 10/087 705/28 |

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <URL:http://www.researchgate.net/publication/221568350_How_to_nudge_in_Situ_designing_lambent_devices_to_deliver_salient_information_in_supermarkets>.

Pop, Cristian, "Introduction to the BodyCom Technology", AN1391, DS01391A, Microchip Technology, Inc., May 2, 2011.

Johnson, Sonji N., "Non-Final Office Action dated May 20, 2016", U.S. Appl. No. 14/745,187, The United States Patent and Trademark Office, May 20, 2016.

Johnson, Sonji N., "Notice of Allowance dated Mar. 8, 2017", U.S. Appl. No. 14/745,187, The United States Patent and Trademark Office, Mar. 8, 2017.

* cited by examiner

US 10,001,402 B1

INSTRUMENTED ITEM STOWAGE SYSTEM WITH MODULAR ELEMENTS

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor quantity of inventory within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
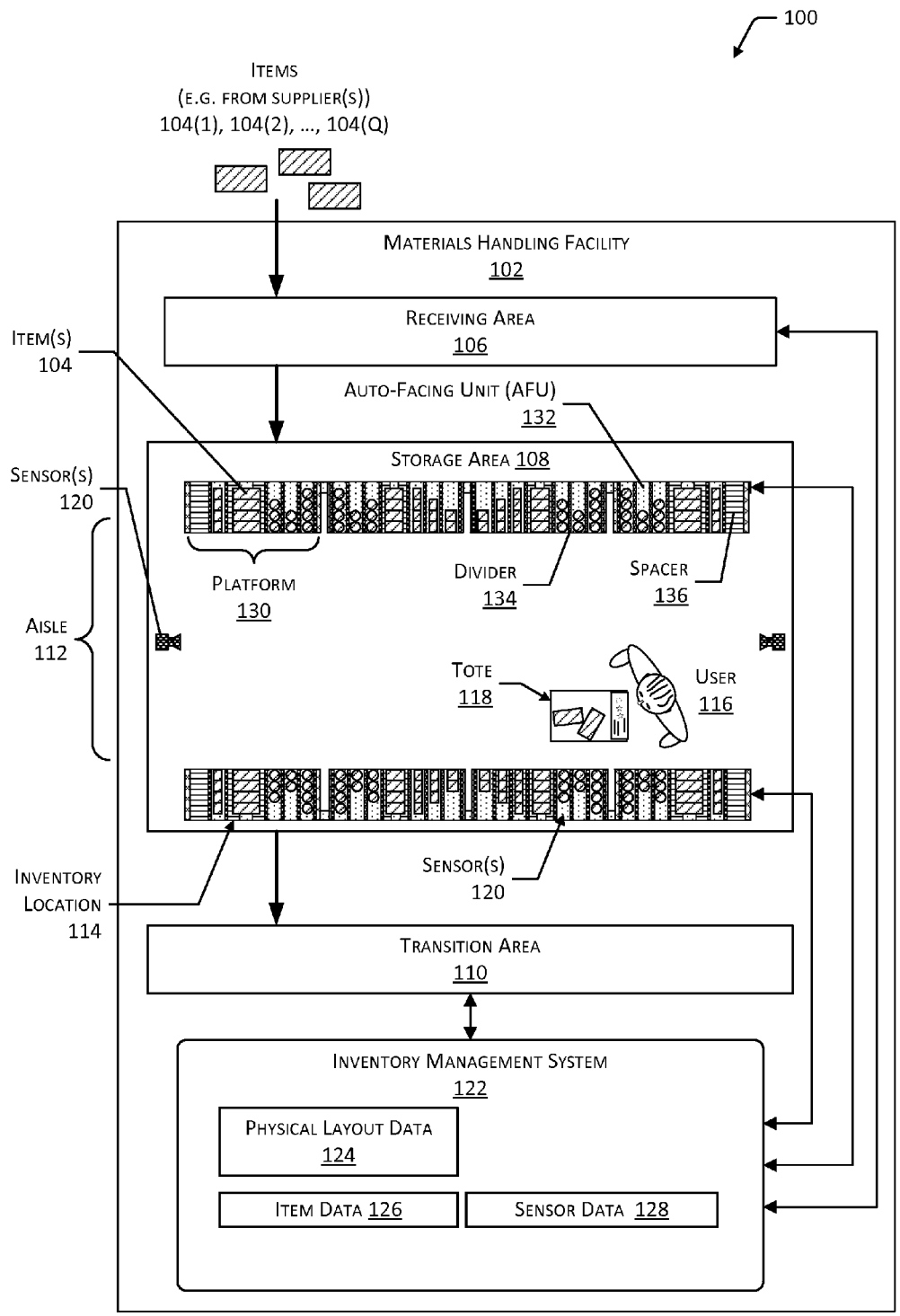
FIG. 1 is a block diagram illustrating a materials handling facility (facility) using a modular item stowage system using modular elements coupled to platforms, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a modular item stowage system and associated modular elements that provide inventory locations. These inventory locations facilitate stowage of items at a materials handling facility (facility) or other setting. The facility may include, or have access to, an inventory management system. The inventory management system may be configured to maintain information about items, users, condition of the facility, and so forth. For example, the inventory management system may maintain data indicative of a number of items at a particular inventory location, what items a particular user is ordered to pick, how many items have been picked or placed at the inventory location, requests for assistance, environmental status of the facility, and so forth. Operation of the facility may be facilitated by using one or more sensors to acquire information about interactions in the facility. Interactions may comprise the user picking an item from an inventory location, placing an item at an inventory location, touching an item, bringing an object such as a hand or face close to an item, and so forth. For example, the inventory management system may use interaction data that indicates what item a user picked from a particular inventory location to adjust the count of inventory stowed at the particular inventory location.

Described in this disclosure is a modular item stowage system that includes devices for stowing and facilitating stowage of items. A platform is described that may be mounted to a support structure such as a counter, upright rack, and so forth. The platform provides physical support and functional support operation of one or more modular elements. The platform may include various sensors to provide sensor data to the inventory management system. For example, the platform may include a plurality of weight sensors to generate weight data about a load on the platform. For example, the load may comprise one or more items. The platform may also include electronics to receive data from the modular elements. The modular elements may include electronics to provide sensor data, such as instrumented auto-facing units (AFUs).

Instrumented and uninstrumented AFUs may hold one or more items. The AFU may include a sled that is under tension from a spring to push items towards a front of the AFU, where it is readily accessible to a user. In the instrumented AFU, a linear position sensor may report sensor data indicative of the position of the sled, such as how close the sled is to the front of the instrumented AFU. Using the sensor data indicative of the position, assuming items in the same instrumented AFU have the same depth, and given information about the depth of a single product, a quantity of items in the instrumented AFU may be determined. Based on a change in quantity from a first time to a second time, a quantity of items that have been picked from or placed to the instrumented AFU may be determined. This information may be used by the inventory management system to operate the facility.

Other modular elements may contain no electronics but support stowage of the items. The modular elements may include dividers, spacers, hangers, bins, and so forth. The dividers may comprise a vertical member of wall that maintains separation between different types of items that may be adjacent to one another on the platform. The spacers may comprise surfaces that provide horizontal distance between other modular elements such as dividers and AFUs. For example, a wide item may extend from a first modular element over a spacer. The hangers may provide pegs, hooks, or other structures from which items may hang. The bins may contain compartments or recesses within which items may be stowed.

By using the devices and techniques described herein, operation of the facility may be improved. The modular item stowage system may be easily reconfigured to hold items in a desired configuration. For example, an operator of the facility may easily reconfigure the AFUs, spacers, dividers, and so forth, on one or more platforms to arrange items to conform to a desired planogram that specifies how items are to be arranged in the inventory locations of the facility. Sensors on the platform, sensors on the modular elements such as the instrumented AFUs, or other sensors in the facility provide sensor data that may be used by the inventory management system to determine quantity on hand at a particular inventory location, quantity picked or placed by the user, and so forth.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) may be held. As used in this disclosure, letters in parenthesis such as "(Q)" indicate an integer value greater than or equal to zero. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, floor locations, or other suitable storage mechanisms for holding, supporting, or storing the items 104. The inventory locations 114 may be affixed to the floor or another portion of the facility's 102 structure. The inventory locations 114 may also be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another.

One or more users 116(1), 116(2), . . . , 116(U) and totes 118(1), 118(2), . . . , 118(T) or other material handling apparatuses may move within the facility 102. For example, the user 116 may move about within the facility 102 to pick or place the items 104 in various inventory locations 114, placing them on the tote 118 for ease of transport. The tote 118 is configured to carry or otherwise transport one or more items 104. For example, the tote 118 may include a basket, cart, bag, bin, and so forth. In other implementations, other material handling apparatuses such as robots, forklifts, cranes, aerial drones, and so forth, may move about the facility 102 picking, placing, or otherwise moving the items 104. For example, a robot may pick an item 104 from a first inventory location 114(1) and move the item 104 to a second inventory location 114(2).

One or more sensors 120 may be configured to acquire information in the facility 102. The sensors 120 may include, but are not limited to, optical sensors, cameras, three-dimensional (3D) sensors, weight sensors, radio frequency (RF) receivers, temperature sensors, humidity sensors, vibration sensors, and so forth. The sensors 120 may be stationary or mobile, relative to the facility 102. For example, the inventory locations 114 may contain cameras configured to acquire images of picking or placement of items 104 on shelves, of users 116 in the facility 102, and so forth. In another example, the floor of the facility 102 may include weight sensors configured to determine a weight of objects thereupon. The sensors 120 are discussed in more detail below with regard to FIG. 2.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 is depicted functionally rather than schematically. For example, in some implementations, multiple different receiving areas 106, storage areas 108, and transition areas 110 may be interspersed rather than segregated in the facility 102.

The facility 102 may include, or be coupled to, an inventory management system 122. The inventory management system 122 is configured to interact with users 116 or devices such as sensors 120, robots, material handling equipment, computing devices, and so forth, in one or more of the receiving area 106, the storage area 108, or the transition area 110.

During operation of the facility 102, the sensors 120 may be configured to provide information suitable for tracking the location of objects within the facility 102, their movement, and so forth. For example, a series of images acquired by the camera may indicate removal of an item 104 from a particular inventory location 114 by the user 116 and placement of the item 104 on or at least partially within the tote 118. Objects may include, but are not limited to, items 104, users 116, totes 118, and so forth. In another example, sensor data from an instrumented auto-facing unit may be used to determine a quantity on hand at a particular inventory location 114, change in quantity of items 104 resulting from a pick or place, and so forth.

The facility 102 may be configured to receive different kinds of items 104 from various suppliers and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item 104, depending on the nature of the enterprise that operates the facility 102.

Upon being received from a supplier at the receiving area 106, the items 104 may be prepared for storage in the storage area 108. For example, in some implementations, items 104 may be unpacked or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable units, individual units, or multiple units, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in instrumented AFUs, bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility 102, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another or from one entity to another. For example, the transition area 110 may be a packing station within the facility 102. When the item 104 arrives at the transition area 110, the items 104 may be transitioned from the storage area 108 to the packing station. Information about the transition may be maintained by the inventory management system 122.

In another example, if the items 104 are departing the facility 102, a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a user 116 may purchase or rent the items 104 and remove the items 104 from the facility 102. During use of the facility 102, the user 116 may move about the facility 102 to perform various tasks, such as picking or placing the items 104 in the inventory locations 114.

The inventory management system 122 may be configured to access physical layout data 124, item data 126, or other information during operation. The physical layout data 124 comprises information such as the arrangement of inventory locations 114 and modular elements of the modular item stowage system, such as described below in more detail. The item data 126 may comprise information about one or more of the items 104. The item data 126 may include, but is not limited to, weight of a single item 104 (or package of items), physical dimensions of packaging, images of a single item 104 from different points of view, and so forth. The physical dimensions of the packaging may include height, width, depth, and so forth, of the single item 104, a package of items, or other unit. The item data 126 may also include information indicative of a particular inventory location 114 at which the item 104 may be stowed, and so forth.

In some implementations, items 104 may be processed, such as at the receiving area 106, to generate at least a portion of the item data 126. For example, an item 104 not previously stored by the inventory management system 122 may be scanned or measured to determine the physical dimensions as part of a process to receive the item 104 into the facility 102. In another example, the receiving process at the facility 102 may include receiving or accessing previously generated information about the item 104. Continuing the example, an electronic manifest record may include an item identifier, weight, physical dimensions, and so forth.

The one or more sensors 120 may produce sensor data 128. For example, the cameras may produce image data, weight sensors may produce weight data, instrumented AFUs may provide position data indicative of a position of the sled or amount of displacement of the sled, and so forth.

The modular item stowage system may include one or more platforms 130. The platform 130 may be freestanding, mounted to a support structure, suspended from an overhead structure, and so forth. Each platform 130 provides a structure to which one or more modular elements may be coupled. An overall shape of the platform 130 may be a rectangle. In other implementations, the platform 130 may have an overall shape that is a quadrilateral, triangle, hexagon, circle, or other polyhedron. The modular elements may include, but are not limited to, instrumented auto-facing units (AFUs) 132, dividers 134, spacers 136, and so forth. The platform 130 may provide one or more bays for holding processing components such as sensor controllers, computing devices, and so forth. These bays may provide environment protection for the devices therein. The platform 130 may include one or more sensors 120. For example, the platform 130 may include a plurality of weight sensors to generate weight data of a load supported by the platform 130. A controller may determine one or more first weight values from the weight measured by the plurality of weight sensors. The controller may determine a change in weight of the load. The change in weight may be associated with mounting of an empty modular element to the platform 130. For example, the association may be based on a lookup table that compares the change in weight of the load with predetermined weights of different modular elements. When the change in weight matches one of the predetermined weights within a threshold tolerance, the weight change may be associated with the addition or removal of a particular type of modular element. The controller may then determine one or more tare weight values of the load on the platform, such as including the empty modular element which has been added or removed. Features of the platform 130 are discussed in more detail below with regard to FIGS. 4-7.

A mechanical coupling may be maintained between the modular element and the platform 130. For example, the platform 130 may provide physical support to the modular element. The mechanical coupling may include the use of one or more of mechanical engagement features, magnets, gravity, and so forth. For example, the modular element may rest atop the platform 130 that supports it. In another example, the modular element may comprise an AFU 132 (instrumented or uninstrumented) having tabs to engage corresponding slots on the platform 130 and a magnet on the AFU 132 to apply a magnetic force to hold the platform 130 and the AFU 132 together.

The coupling between the modular element and the platform 130 may include providing data communication, electrical power, and so forth, between the modular element and the platform 130. For example, the instrumented AFU 132 may electrically couple to the platform 130 to receive power for onboard electronics and provide sensor data 128. In another example, data may be transferred between the modular element and the platform 130 optically, such as using optical waveguides, infrared transmission, and so forth. The instrumented AFU 132 is discussed in more detail below with regard to FIGS. 8-10.

The platforms 130 may be positioned throughout the facility 102 and reconfigured at will by an operator of the facility 102. For example, the platform 130 may be configured to use platform base supports to mount to a support member, such as a rack. Upon a particular platform 130, various modular elements may be arranged in various permutations. For example, the platform 130 may be configured with AFUs 132 alternating with dividers 134. The AFUs 132 are used to stow the items 104 therein, while the dividers 134 maintain tidiness of the facility 102 by constraining items 104 to a particular lane defined by the inventory location 114. The dividers 134 may comprise vertical walls. These vertical walls may divide the items held by a first modular element from a second modular element. The walls may comprise one or more of solid sheets, wire, slats, and so forth. The solid sheets may comprise aluminum, steel, plastic, and so forth. The one or more wires may be straight or bent to form the vertical wall.

In some situations, the item 104 to be stowed may exceed the width of the AFU 132. In this situation, spacers 136 may be placed adjacent to the AFU 132 to provide additional width for the item 104 to extend into or over. As the needs of the facility 102 change, the modular elements may be added, removed, or rearranged to suit changing configurations of items 104 while the platform 130 is emplaced. For example, the modular elements on a platform 130 that is mounted to a support member may be rearranged without removal of the platform 130 itself. The platforms 130 may be added, removed, repositioned, and so forth, within the facility 102. For example, a platform 130 may be removed or added to the support member without affecting neighboring platforms 130.

The modular elements may be configured to have a common sizing to facilitate modular operation. A common depth (front-to-back length) of the modular elements may be used. The width of the modular elements may vary as an integer multiple of a minimum size increment. Different modular elements may have different widths. For example, the minimum size increment may be ⅓ inch with modular elements such as the AFUs 132, the dividers 134, and the spacers 136 available in widths such 1⅓ inch, 2 inches, 2⅔ inches, and so forth.

By utilizing the modular item stowage system described, the facility 102 may be easily configured to support different items 104, different arrangements of items 104, and so forth. Furthermore, the sensors 120 in the platform 130 and other modular elements provide sensor data 128 to the inventory management system 122. This sensor data 128 may be used to maintain information such as quantity of an item 104 picked, placed, currently on hand, and so forth.

Figure 2:
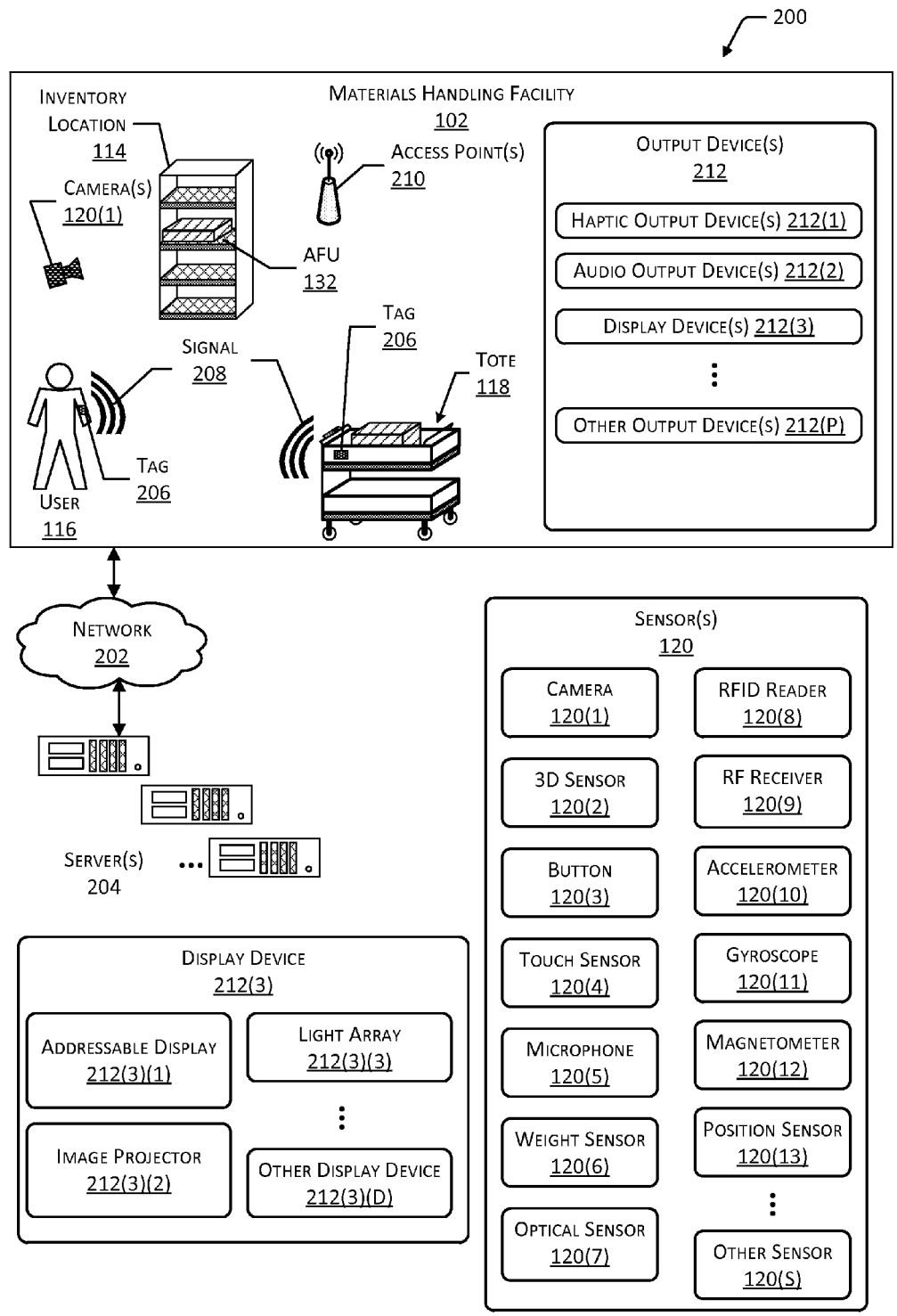
FIG. 2 is a block diagram illustrating additional details of the facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks such as an institutional or personal intranet, public networks such as the Internet, or a combination thereof. The network 202 may utilize wired technologies (e.g., wires, fiber optic cables, and so forth), wireless technologies (e.g., radio frequency, infrared, acoustic, optical, and so forth), or other connection technologies. The network 202 is representative of any type of communication network, including one or more of data networks or voice networks. The network 202 may be implemented using a wired infrastructure (e.g., copper cable, fiber optic cable, and so forth), a wireless infrastructure (e.g., cellular, microwave, satellite, and so forth), or other connection technologies.

The servers 204 may be configured to execute one or more modules or software applications associated with the inventory management system 122. While the servers 204 are illustrated as being in a location outside of the facility 102, in other implementations, at least a portion of the servers 204 may be located at the facility 102. The servers 204 are discussed in more detail below with regard to FIG. 3.

The users 116, the totes 118, or other objects in the facility 102 may be equipped with one or more tags 206. The tags 206 may be configured to emit a signal 208. In one implementation, the tag 206 may be a radio frequency identification (RFID) tag configured to emit a RF signal 208 upon activation by an external signal. For example, the external signal may comprise a radio frequency signal or a magnetic field configured to energize or activate the RFID tag 206. In another implementation, the tag 206 may comprise a transmitter and a power source configured to power the transmitter. For example, the tag 206 may comprise a Bluetooth Low Energy (BLE) transmitter and battery. In other implementations, the tag 206 may use other techniques to indicate presence of the tag 206. For example, an acoustic tag 206 may be configured to generate an ultrasonic signal 208, which is detected by corresponding acoustic receivers. In yet another implementation, the tag 206 may be configured to emit an optical signal 208.

The inventory management system 122 may be configured to use the tags 206 for one or more of identification of the object, determining a location of the object, and so forth.

For example, the users 116 may wear tags 206, the totes 118 may have tags 206 affixed, and so forth, which may be read and, based at least in part on signal strength, used to determine identity and location.

Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, at a ceiling, at an inventory location 114, on a tote 118, may be carried or worn by a user 116, and so forth.

The sensors 120 may include one or more cameras 120(1). The one or more cameras 120(1) may include imaging sensors configured to acquire images of a scene. The imaging sensors are configured to detect light in one or more wavelengths including, but not limited to, terahertz, infrared, visible, ultraviolet, and so forth. The imaging sensors may comprise charge coupled devices (CCD), complementary metal oxide semiconductor (CMOS) devices, microbolometers, and so forth. The inventory management system 122 may use image data acquired by the cameras 120(1) during operation of the facility 102. For example, the inventory management system 122 may identify items 104, users 116, totes 118, and so forth, based at least in part on their appearance within the image data acquired by the cameras 120(1). The cameras 120(1) may be mounted in various locations within the facility 102. For example, cameras 120(1) may be mounted overhead, on inventory locations 114, and so forth.

One or more 3D sensors 120(2) may also be included in the sensors 120. The 3D sensors 120(2) are configured to acquire spatial or 3D data, such as depth information, about objects within a field of view of a sensor 120. The 3D sensors 120(2) include range cameras, lidar systems, sonar systems, radar systems, structured light systems, stereo vision systems, optical interferometry systems, and so forth. The inventory management system 122 may use the 3D data acquired by the 3D sensors 120(2) to identify objects, determine a location of an object in 3D real space, and so forth.

One or more buttons 120(3) may be configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116. For example, the tote 118 may be configured with a button 120(3) to accept input from the user 116 and send information indicative of the input to the inventory management system 122.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 122 may use data from the touch sensors 120(4) to receive information from the user 116. For example, the touch sensor 120(4) may be integrated with the tote 118 to provide a touchscreen with which the user 116 may select from a menu of one or more particular items 104 for picking, enter a manual count of items 104 at an inventory location 114, and so forth.

One or more microphones 120(5) may be configured to acquire information indicative of sound present in the environment. In some implementations, arrays of microphones 120(5) may be used. These arrays may implement beamforming techniques to provide for directionality of gain. The inventory management system 122 may use the one or more microphones 120(5) to acquire information from acoustic tags 206, accept voice input from the users 116, determine ambient noise level, and so forth.

One or more weight sensors 120(6) are configured to measure the weight of a load. For example, the platform 130 may include weight sensors 120(6) to measure objects supported thereby, such as modular elements, items 104, and so forth. The weight sensors 120(6) may be configured to measure the weight of the load at the tote 118, on the floor of the facility 102, and so forth. The weight sensors 120(6) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 120(6) may operate as transducers that generate one or more signals based on an applied force, such as that of the load due to gravity. For example, the weight sensor 120(6) may comprise a load cell having a strain gauge and a structural member that deforms slightly when weight is applied. By measuring a change in the electrical characteristic of the strain gauge, such as capacitance or resistance, the weight may be determined. The inventory management system 122 may use the data acquired by the weight sensors 120(6), such as on the platform 130, to identify an object, determine a change in the quantity of objects, determine a location of an object, maintain shipping records, and so forth.

The sensors 120 may include one or more optical sensors 120(7). The optical sensors 120(7) may be configured to provide data indicative of one or more of color or intensity of light impinging thereupon. For example, the optical sensor 120(7) may comprise a photodiode and associated circuitry configured to generate a signal or data indicative of an incident flux of photons. For example, the optical sensor 120(7) may comprise an ambient light sensor such as the ISL76683 as provided by Intersil Corporation of Milpitas, Calif., USA, or the MAX44009 as provided by Maxim Integrated Products Inc. of San Jose, Calif., USA. In other implementations, other optical sensors 120(7) may be used. The optical sensors 120(7) may be sensitive to one or more of infrared light, visible light, or ultraviolet light. For example, the optical sensors 120(7) may be sensitive to infrared light.

The optical sensors 120(7) may include photodiodes, photoresistors, photovoltaic cells, quantum dot photoconductors, bolometers, pyroelectric infrared detectors, and so forth. For example, the optical sensor 120(7) may use germanium photodiodes to detect infrared light. In some implementations, the optical sensors 120(7) may be arranged in a two dimensional array (such as rows and columns) and mounted beneath, above, or to the side of an inventory location 114. For example, the array may be below the AFU 132, incorporated into a spacer 136, and so forth. The sensor data 128 from the array may be used to detect shadows cast by the items 104, users 116, and so forth. This information may be used by the inventory management system 122 to track objects, determine interactions with items 104, and so forth.

One or more radio frequency identification (RFID) readers 120(8), near field communication (NFC) systems, and so forth, may be included as sensors 120. For example, the RFID readers 120(8) may be configured to read the RF tags 206. Information acquired by the RFID reader 120(8) may be used by the inventory management system 122 to identify an object associated with the RF tag 206 such as the item 104, the user 116, the tote 118, and so forth. For example, based on information from the RFID readers 120(8) detecting the RF tag 206 at different times and RFID readers 120(8) having different locations in the facility 102, a velocity of the RF tag 206 may be determined.

One or more RF receivers 120(9) may also be included as sensors 120. In some implementations, the RF receivers 120(9) may be part of transceiver assemblies. The RF receivers 120(9) may be configured to acquire RF signals 208 associated with Wi-Fi, Bluetooth, ZigBee, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source, such as a communication interface onboard the tote 118.

The sensors 120 may include one or more accelerometers 120(10), which may be worn or carried by the user 116, mounted to the tote 118, and so forth. The accelerometers 120(10) may provide information such as the direction and magnitude of an imposed acceleration. Data such as rate of acceleration, determination of changes in direction, speed, and so forth, may be determined using the accelerometers 120(10).

A gyroscope 120(11) may provide information indicative of rotation of an object affixed thereto. For example, the tote 118 or other objects may be equipped with a gyroscope 120(11) to provide data indicative of a change in orientation of the object.

A magnetometer 120(12) may be used to determine an orientation by measuring ambient magnetic fields, such as the terrestrial magnetic field. The magnetometer 120(12) may be worn or carried by the user 116, mounted to the tote 118, and so forth. For example, the magnetometer 120(12) mounted to the tote 118 may act as a compass and provide information indicative of which direction the tote 118 is oriented.

A position sensor 120(13) provides information indicative of a position of an object. In one implementation, the position sensor 120(13) may be incorporated into the instrumented AFU 132 to provide information about a position of one or more of items 104, a sled of the instrumented AFU 132, a position target on the sled, and so forth. The position sensor 120(13) may use optical, magnetic, capacitive, inductive, resonant inductive, resistive, ultrasonic, or other techniques to determine presence of an object. For example, the position sensor 120(13) may comprise an ultrasonic transducer to determine a distance to a portion of the sled. In another example, the position sensor 120(13) may comprise a linear potentiometer or string potentiometer that measures position or displacement of an object based on a change in electrical resistance. The position sensor 120(13) may report a value as one or more of an analog signal or a digital signal. For example, a value of the amplitude of an analog signal such as the electrical resistance of the linear potentiometer may be indicative of the position. A digital signal may be indicative of the position. For example, the position may be expressed as an 8 bit value. In some implementations, the position sensor 120(13) may include a controller to generate sensor data 128 indicative of the position or displacement of the object. For example, the controller may determine a linear measurement in inches or meters based on the amplitude of the analog signal, the 8 bit value, and so forth. The position sensor 120(13) is discussed in more detail below with regard to FIG. 9.

The sensors 120 may include other sensors 120(S) as well. For example, the other sensors 120(S) may include proximity sensors, ultrasonic rangefinders, thermometers, barometric sensors, hygrometers, and so forth. For example, the inventory management system 122 may use information acquired from thermometers and hygrometers in the facility 102 to direct the user 116 to check on delicate items 104 stored in a particular inventory location 114, which is overheating, too dry, too damp, and so forth.

In some implementations, the camera 120(1) or other sensors 120 may include hardware processors, memory, and other elements configured to perform various functions. For example, the cameras 120(1) may be configured to generate image data, send the image data to another device such as the server 204, and so forth.

The facility 102 may include one or more access points 210 configured to establish one or more wireless networks. The access points 210 may use Wi-Fi, NFC, Bluetooth, or other technologies to establish wireless communications between a device and the network 202. The wireless networks allow the devices to communicate with one or more of the sensors 120, the inventory management system 122, the tag 206, a communication device of the tote 118, or other devices.

Output devices 212 may also be provided in the facility 102. The output devices 212 are configured to generate signals, which may be perceived by the user 116 or detected by the sensors 120. In some implementations, the output devices 212 may be used to provide illumination of the optical sensor array.

Haptic output devices 212(1) are configured to provide a signal that results in a tactile sensation to the user 116. The haptic output devices 212(1) may use one or more mechanisms such as electrical stimulation or mechanical displacement to provide the signal. For example, the haptic output devices 212(1) may be configured to generate a modulated electrical signal, which produces an apparent tactile sensation in one or more fingers of the user 116. In another example, the haptic output devices 212(1) may comprise piezoelectric or rotary motor devices configured to provide a vibration, which may be felt by the user 116.

One or more audio output devices 212(2) may be configured to provide acoustic output. The acoustic output includes one or more of infrasonic sound, audible sound, or ultrasonic sound. The audio output devices 212(2) may use one or more mechanisms to generate the acoustic output. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

The display devices 212(3) may be configured to provide output, which may be seen by the user 116 or detected by a light-sensitive sensor such as a camera 120(1) or an optical sensor 120(7). In some implementations, the display devices 212(3) may be configured to produce output in one or more of infrared, visible, or ultraviolet light. The output may be monochrome or color.

The display devices 212(3) may be emissive, reflective, or both. An emissive display device 212(3), such as using light emitting diodes (LEDs), is configured to emit light during operation. In comparison, a reflective display device 212(3), such as using an electrophoretic element, relies on ambient light to present an image. Backlights or front lights may be used to illuminate non-emissive display devices 212(3) to provide visibility of the output in conditions where the ambient light levels are low.

The display devices 212(3) may include, but are not limited to, microelectromechanical systems (MEMS), spatial light modulators, electroluminescent displays, quantum dot displays, liquid crystal on silicon (LCOS) displays, cholesteric displays, interferometric displays, liquid crystal displays (LCDs), electrophoretic displays, and so forth. For example, the display device 212(3) may use a light source and an array of MEMS-controlled mirrors to selectively direct light from the light source to produce an image. These display mechanisms may be configured to emit light, modulate incident light emitted from another source, or both. The display devices 212(3) may operate as panels, projectors, and so forth.

The display devices 212(3) may be configured to present images. For example, the display device 212(3) may comprise an addressable display 212(3)(1). The addressable display 212(3)(1) may comprise elements that may be independently addressable to produce output, such as pixels. For example, the addressable display 212(3)(1) may produce an image using a two-dimensional array of pixels.

In some implementations, the display devices 212(3) may be configured to provide non-image data, such as text characters, colors, and so forth. For example, an addressable display 212(3)(1) may comprise a segmented electrophoretic display device 212(3), segmented LED, and so forth, and may be used to present information such as a stock keeping unit (SKU) number, quantity on hand, and so forth. The display devices 212(3) may also be configurable to vary the color of the segment, such as using multicolor/multiwavelength LED segments.

The display devices 212(3) may include image projectors 212(3)(2). For example, the image projector 212(3)(2) may be configured to project an image onto objects, illuminate at least a portion of an optical sensor array, and so forth. The image may be generated using MEMS, LCOS, and so forth.

The display devices 212(3) may include a light array 212(3)(3). The light array 212(3)(3) may comprise a plurality of discrete emissive elements configurable to emit light. The discrete emissive elements (or assemblies thereof) may be separated from one another by a distance such that, when image data of the light array 212(3)(3) is acquired, one emissive element may be distinguished from another. For example, the light array 212(3)(3) may comprise a plurality of infrared LEDs separated by at least 0.5 centimeters.

Other display devices 212(3)(D) may also be used in the facility 102. The display devices 212(3) may be located at various points within the facility 102. For example, the addressable displays 212(3)(1) or the light arrays 212(3)(3) may be located on inventory locations 114, totes 118, in or on the floor of the facility 102, and so forth.

Other output devices 212(P) may also be present. For example, the other output devices 212(P) may include scent/odor dispensers, document printers, 3D printers or fabrication equipment, and so forth.

Figure 3:
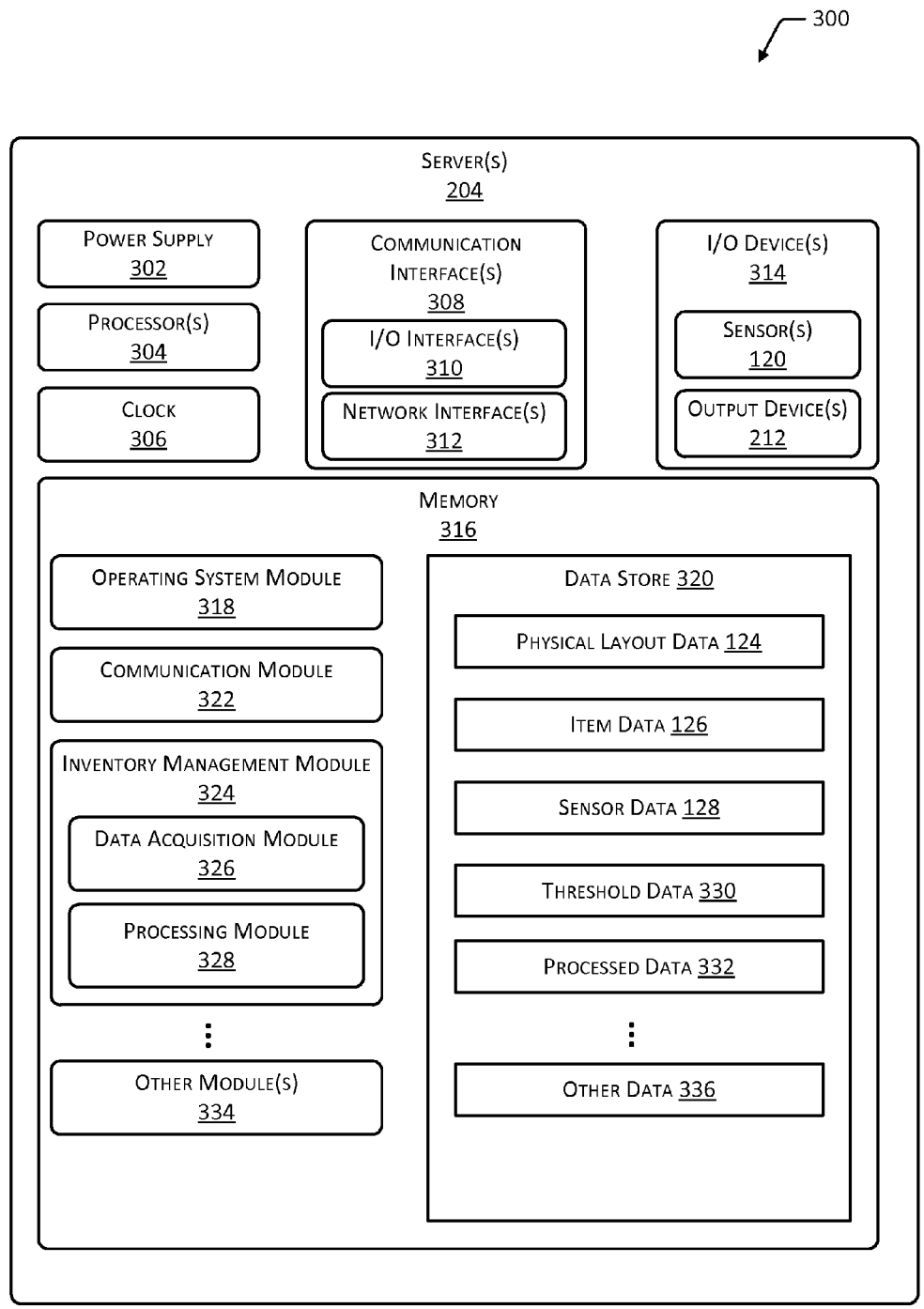
FIG. 3 is a block diagram of a server configured to support operation of the facility, according to some implementations.

FIG. 3 illustrates a block diagram 300 of a server 204 configured to support operation of the facility 102, according to some implementations. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing", "software as a service (SaaS)", "platform computing", "network-accessible platform", "cloud services", "data centers", and so forth. Services provided by the server 204 may be distributed across one or more physical or virtual devices.

One or more power supplies 302 may be configured to provide electrical power suitable for operating the components in the server 204. The one or more power supplies 302 may comprise batteries, capacitors, fuel cells, photovoltaic cells, wireless power receivers, conductive couplings suitable for attachment to an external power source such as provided by an electric utility, and so forth. The server 204 may include one or more hardware processors 304 (processors) configured to execute one or more stored instructions. The processors 304 may comprise one or more cores. One or more clocks 306 may provide information indicative of date, time, ticks, and so forth. For example, the processor 304 may use data from the clock 306 to associate a particular interaction with a particular point in time.

The server 204 may include one or more communication interfaces 308 such as input/output (I/O) interfaces 310, network interfaces 312, and so forth. The communication interfaces 308 enable the server 204, or components thereof, to communicate with other devices or components. The communication interfaces 308 may include one or more I/O interfaces 310. The I/O interfaces 310 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 310 may couple to one or more I/O devices 314. The I/O devices 314 may include input devices such as one or more of a sensor 120, keyboard, mouse, scanner, and so forth. The I/O devices 314 may also include output devices 212 such as one or more of a display device 212(3), printer, audio speakers, and so forth. In some embodiments, the I/O devices 314 may be physically incorporated with the server 204 or may be externally placed.

The network interfaces 312 may be configured to provide communications between the server 204 and other devices, such as the totes 118, routers, access points 210, and so forth. The network interfaces 312 may include devices configured to couple to personal area networks (PANs), local area networks (LANs), wide area networks (WANs), and so forth. For example, the network interfaces 312 may include devices compatible with Ethernet, Wi-Fi, Bluetooth, ZigBee, and so forth.

The server 204 may also include one or more busses or other internal communications hardware or software that allow for the transfer of data between the various modules and components of the server 204.

As shown in FIG. 3, the server 204 includes one or more memories 316. The memory 316 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 316 provides storage of computer-readable instructions, data structures, program modules, and other data for the operation of the server 204. A few example functional modules are shown stored in the memory 316, although the same functionality may alternatively be implemented in hardware, firmware, or as a system on a chip (SoC).

The memory 316 may include at least one operating system (OS) module 318. The OS module 318 is configured to manage hardware resource devices such as the I/O interfaces 310, the I/O devices 314, the communication interfaces 308, and provide various services to applications or modules executing on the processors 304. The OS module 318 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 316 may be a data store 320 and one or more of the following modules. These modules may be executed as foreground applications, background tasks, daemons, and so forth. The data store 320 may use a flat file, database, linked list, tree, executable code, script, or other data structure to store information. In some implementations, the data store 320 or a portion of the data store 320 may be distributed across one or more other devices including the servers 204, network attached storage devices, and so forth.

A communication module 322 may be configured to establish communications with one or more of the totes 118, sensors 120, display devices 212(3), other servers 204, or other devices. The communications may be authenticated, encrypted, and so forth.

The memory 316 may store an inventory management module 324. The inventory management module 324 is configured to provide the inventory functions as described herein with regard to the inventory management system 122. For example, the inventory management module 324 may track items 104 between different inventory locations 114, to and from the totes 118, and so forth.

The inventory management module 324 may include one or more of a data acquisition module 326 or a processing module 328. The data acquisition module 326 may be configured to acquire and access information associated with operation of the facility 102. For example, the data acquisition module 326 may be configured to acquire sensor data 128 from one or more sensors 120. This information may be stored in the data store 320.

The processing module 328 may be configured to process the sensor data 128 to generate information such as a quantity of items 104 at an inventory location 114, change in quantity over time, and so forth. The processing module 328 may utilize or more of the physical layout data 124, item data 126, or threshold data 330 during operation. The threshold data 330 may specify one or more thresholds, such as permissible tolerances or variances. For example, the thresholds may specify a percentage variance between an estimated change in position based on item data 126 and change in quantity and a measured change in position measured by the position sensor 120(13).

The processing module 328 may be configured to process the sensor data 128 from the weight sensors 120(6). For example, the sensor data 128 from the weight sensors 120(6) may be used to determine a change in quantity, determine where from upon the platform 130 an item 104 was removed, and so forth. In another example, the processing module 328 may access the sensor data 128 acquired by the instrumented AFU 132(27). The sensor data 128 from the position sensor 120(13) may indicate a linear change in position of a sled of the instrumented AFU 132(27) of 3.2 inches. The processing module 328 may access the physical layout data 124 to determine that instrumented AFU 132(27) is used to store item 104(114) described as "canned dog food". The physical characteristics for the item 104(114) may be retrieved from the item data 126, indicating a per-item depth of 3 inches for each can of dog food. The processing module 328 may divide the linear change in position by the per-item depth to generate a measured count of quantity change. Continuing the example, 3.2/3=1.07. The quotient may be rounded to produce a result that a quantity of 1 of item 104(114) was removed from the instrumented AFU 132(27). As a result, the inventory management module 324 may decrease the quantity of the item 104(114) stored at instrumented AFU 132(27) by 1.

In some implementations, the processing module 328 may use sensor data 128, such as image data obtained from the cameras 120(1), to determine proximity of the user 116 to the inventory location 114 that includes the instrumented AFU 132. As a result, a quantity associated with the user 116 may be changed based on the sensor data 128 obtained from the instrumented AFU 132. Continuing the example, a quantity of 1 of the item 104(114) may be added to a manifest or order pick list associated with the user 116.

Processing of the sensor data 128 or other data may be performed by the processing module 328 or other modules implementing at least in part using the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 128.

Techniques such as artificial neural networks (ANN), active appearance models (AAM), active shape models (ASM), principal component analysis (PCA), cascade classifiers, and so forth, may also be used to process the sensor data 128 or other data. For example, the ANN may be a trained using a supervised learning algorithm such that object identifiers are associated with images of particular objects within training images provided to the ANN. Once trained, the ANN may be provided with the sensor data 128 such as the image data from a camera 120(1), and may provide, as output, the object identifier.

Other modules 334 may also be present in the memory 316 as well as other data 336 in the data store 320. For example, the other modules 334 may include an accounting module while the other data 336 may include billing data. The accounting module may be configured to assess charges to accounts associated with particular users 116 or other entities, while the billing data may include information such as payment account numbers.

Modular Item Stowage Hardware

Features in the following figures are depicted for purposes of illustration and not necessarily as limitations. The figures are not to scale.

Figure 4:
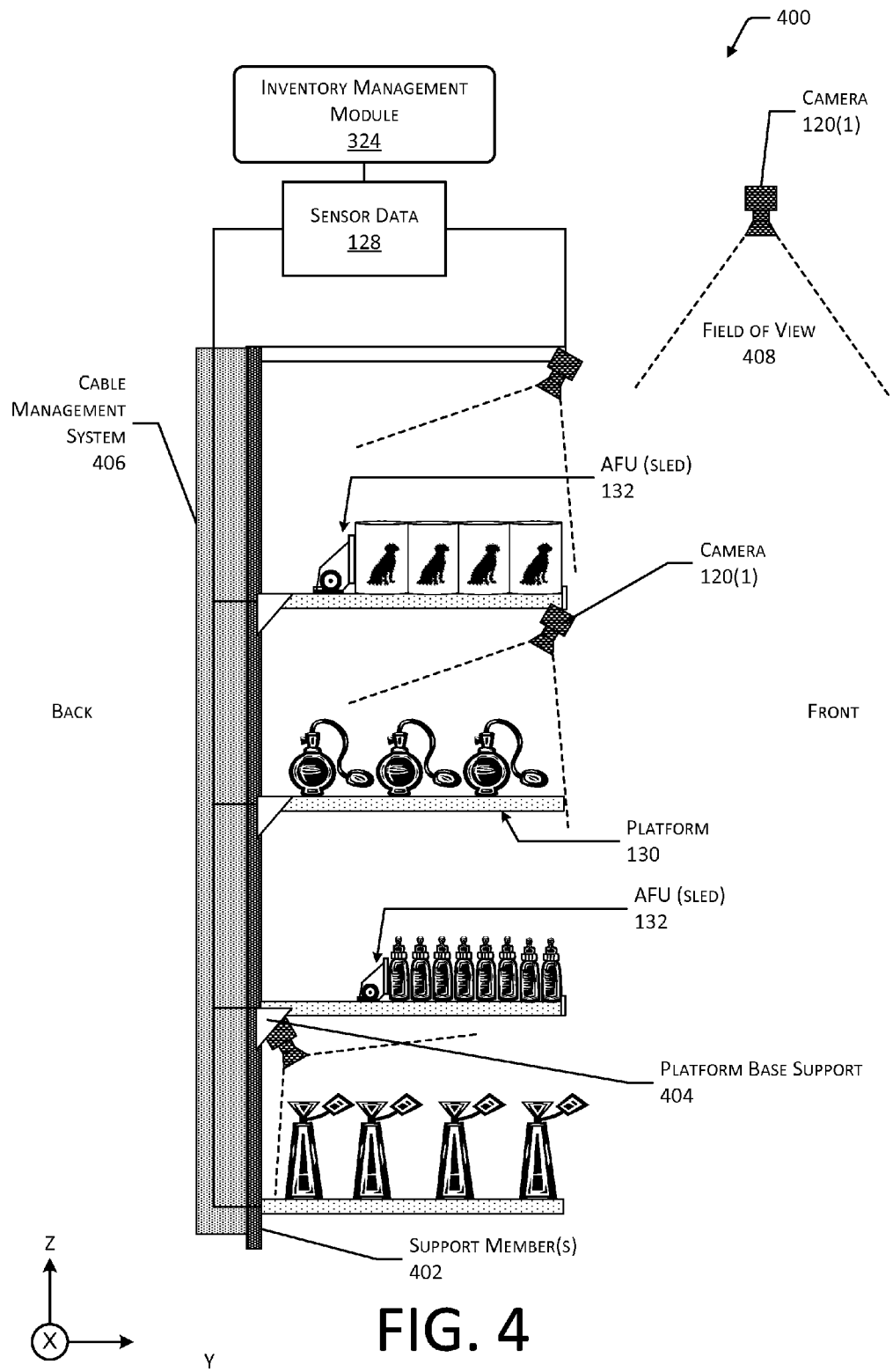
FIG. 4 illustrates a side view of an inventory location comprising the platforms, according to some implementations.

FIG. 4 illustrates a side view 400 of inventory locations 114 comprising the platforms 130, according to some implementations. As specified by an operator of the facility 102, the inventory location 114 may include a group of platforms 130 (such as an entire rack), an individual platform 130, or the discrete locations for storage of items 104 therein, such as the AFUs 132, bins, hangers, and so forth. Two AFUs 132 are depicted mounted to two of the platforms 130 in this illustration.

A support member 402 provides a structure to which one or more platform base supports 404 may be affixed. For example, the support member 402 may comprise an upright member with slots or other mechanical engagement features.

The slots or other mechanical engagement features may be regularly spaced. The platform base supports 404 may be able to mechanically engage the support member 402 and the platform 130. In some implementations, the platform base supports 404 may be integral or otherwise affixed to the platform 130. For example, hooks or other mechanical engagement features may extend from a back of the platform 130. In this illustration, the support member 402 is depicted as positioned to the back of the platform 130. In other implementations, the support member 402 may be in different positions relative to the platforms 130. For example, the support member 402 may support the platform 130 from a front of the platform 130, where the front is proximate to the location of a user 116 during typical use of picking or placing items 104.

The support member 402 may be vertical, at an angle to vertical, or horizontal. For example, the support member 402 may comprise a horizontal rail supported by legs. In other implementations, the support member 402 may suspend one or more platforms 130 from an overhead structure.

A plurality of platforms 130 may be supported from one or more of the support members 402. The support member 402 may provide for one or more of horizontal or vertical separation between platforms 130. For example, a first platform 130(1) may be above a second platform 130(2), side-by-side, and so forth.

A cable management system 406 may be provided to guide cabling connecting the platforms 130 to other devices. For example, the cable management system 406 may route cabling between the platform 130 and Ethernet switches, power supplies, and so forth. In some implementations, integrated busses, cabling, electrical conductors, optical waveguides, and so forth, may be integrated into the support member(s) 402.

In other implementations, a system may be provided for thermal management of the platforms 130 and the devices therein. For example, ductwork or piping may be provided to move a working fluid such as air or water through the platform 130 to remove heat dissipated during the operation of the electronics therein. Continuing the example, the cable management system 406 may incorporate ducts to deliver cool air to the platform 130 and remove warm air from the platform 130.

The cabling integrated into the support member(s) 402 may also provide the physical media for communication of the network 202, or a portion thereof. For example, the platform 130 may send sensor data 128 to the inventory management module 324 executing on one or more of the servers 204. The inventory management module 324 or another module may also communicate with one or more of the devices onboard the platform 130. For example, the inventory management module 324 may provide configuration information to a computing device onboard the platform 130, the instrumented AFU 132, and so forth. In other implementations, wireless power transfer, wireless data transfer, and so forth, may be used instead of, or in addition to, the cabling. For example, a wireless access point, NFC transceiver, or other devices may be incorporated into the support member 402.

One or more cameras 120(1) are positioned within the facility 102. Each camera 120(1) has a field of view (FOV) 408. Cameras 120(1) may be arranged within the facility 102 to have a FOV 408 that includes at least a portion of one or more of the inventory locations 114. For example, a camera 120(1) may be mounted overhead in the facility 102, such as from the ceiling. In another example, the camera 120(1) may be mounted above a platform 130 with the FOV 408 oriented to where the items 104 may be stowed during use.

Figure 5:
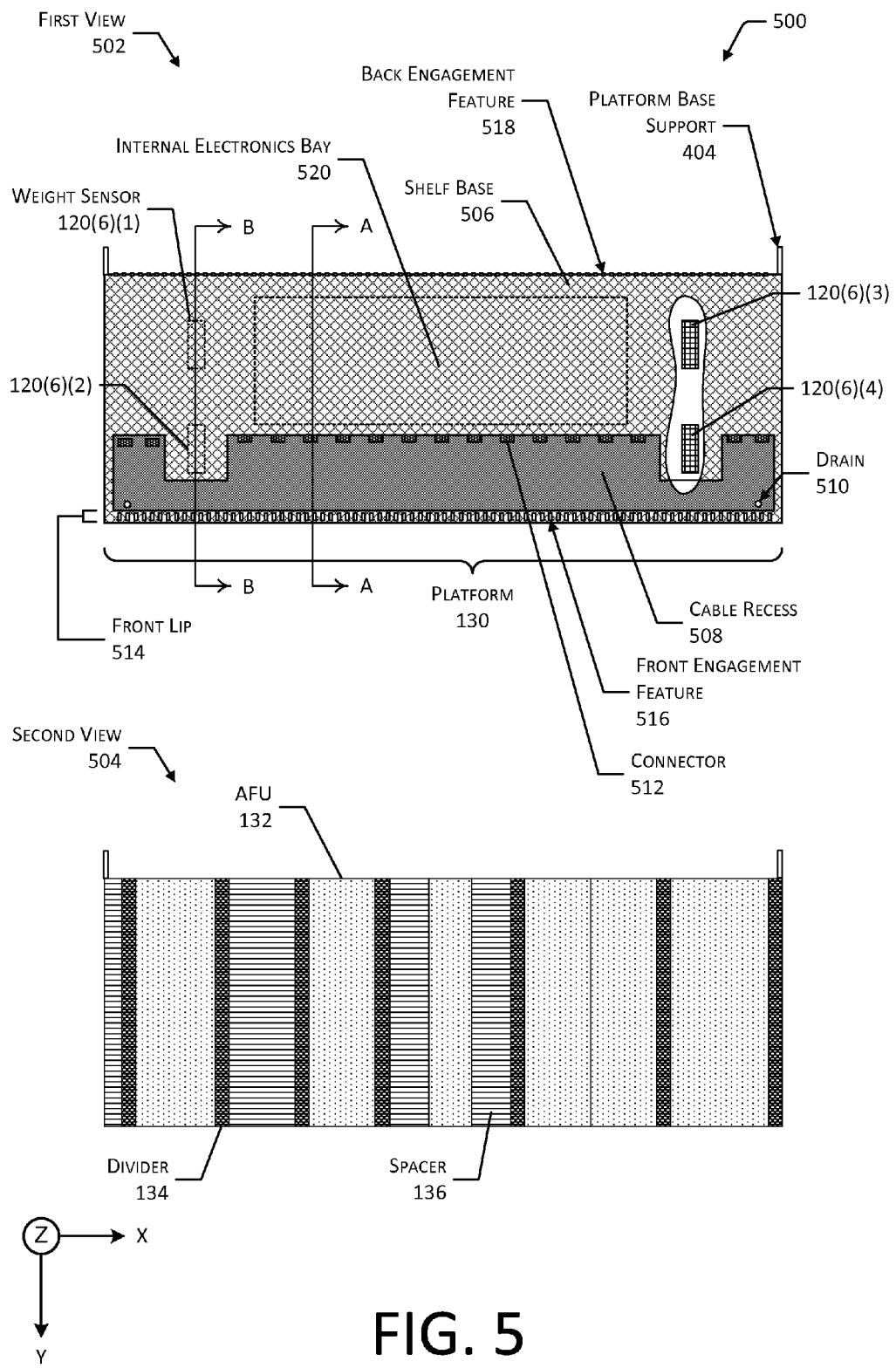
FIG. 5 illustrates top views of a platform before and after mounting of modular elements including instrumented auto-facing units, dividers, and spacers, according to some implementations.

FIG. 5 illustrates two views 500 of a platform 130. A first view 502 depicts the platform 130 in an unpopulated configuration, such as before modular elements have been affixed. A second view 504 depicts the platform 130 in a populated configuration, in which a plurality of modular elements such as AFUs 132, dividers 134, spacers 136, and so forth, have been coupled to the platform 130.

The platform 130 includes a shelf base 506. The shelf base 506 may comprise an upper portion of the platform 130. For example, the shelf base 506 may comprise stainless steel that has been powder coated. In some implementations, the shelf base 506 may have a predominantly planar configuration, describing a flat surface upon which one or more of the modular elements may rest, or be positioned immediately above. The shelf base 506 may have a first elevation at a first height. Within at least a portion of the shelf base 506, a cable recess 508 may be provided.

Located beneath the shelf base 506 may be a plurality of weight sensors 120(6). For example, the location of the weight sensors 120(6)(1) and 120(6)(2) under a left side of the shelf base 506 are indicated by a dotted outline. A cutaway view shows the weight sensors 120(6)(3) and 120(6)(4) under a right side of the shelf base 506. The plurality of weight sensors 120(6) may provide sensor data 128 such as weight of a load on the shelf base 506, weight distribution of the load, and so forth. The configuration of the weight sensors 120(6) in the platform 130 are described in more detail below with regard to FIG. 7.

The weight distribution provides information indicative of weight applied to weight sensors 120(6) at different points under the load. Sensor data 128 from a plurality of weight sensors 120(6) may be combined. For example, the weights from the weight sensors 120(6)(1) and 120(6)(2) may be summed to provide a weight measured at a left side of the platform, and weights from the weight sensors 120(6)(3) and 120(6)(4) may be summed to provide a weight measured at a right side of the platform 130. The weight distribution may be expressed as a measured weight at a particular weight sensor 120(6), a ratio or percentage of weight on a weight sensor 120(6), and so forth. For example, the weight distribution data may be expressed as "3213 g left, 2214 g right", as a dimensionless ratio such as "0.59 left, 0.41 right", and so forth.

The cable recess 508 has a second elevation that is lower than the first elevation. In this illustration the second elevation may be distinguished from the first elevation by different crosshatch patterns. In some implementations, the shelf base 506 and the cable recess 508 may be a single piece of material or may be several pieces of material joined together, such as by welding, riveting, adhesives, fasteners, and so forth.

The cable recess 508 provides a volume for routing cabling that connects electronics within the platform 130 to one or more of the modular elements, such as the instrumented AFU 132. The cable recess 508 may be arranged around one or more of the weight sensors 120(6). For example, in this illustration, the cable recess 508 includes two incursions or peninsulas to allow for placement of the weight sensors 120(6)(2) and 120(6)(4) beneath the shelf base 506. In this illustration, the cable recess 508 describes a contiguous area. However, in other implementations, the cable recess 508 may comprise separate compartments or sections. For example, the shelf base 506 may include a plurality of cable recesses 508. The cable recess 508 may be arranged generally towards the front of the shelf base 506.

For example, the cable recess 508 may be arranged in a front third of the distance from the front to the back of the shelf base 506 and extending across the width of the shelf base 506.

Within the cable recess 508 may be one or more drains 510. The drains 510 provide a path for spilled liquids to exit the cable recess 508. For example, the instrumented AFU 132 above the cable recess 508 may hold containers of bottled water. Should one of the containers leak, the drain 510 prevents accumulation of the water.

Also arranged within the cable recess 508 are one or more connectors 512. The connectors 512 are configured to couple to components in one or more of the modular elements. In one implementation, the connectors 512 may comprise connectors utilizing the RJ-45 form factor. The connectors 512 may be rated to the Ingress Protection (IP) standards IP67 or IP68 as described by the International Electrotechnical Commission (IEC) in specification IEC 60529.

A front lip 514 is arranged along a front of the platform 130. In some implementations, the front lip 514 may comprise an extension or portion of the shelf base 506 and may share a common elevation with the shelf base 506. In other implementations, the front lip 514 may be at a different elevation, such as above or below the elevation of the shelf base 506.

The front lip 514 may include one or more front engagement features 516. A plurality of front engagement features 516 may be arranged at predetermined spacing intervals with respect to one another along the front lip 514. The front engagement features 516 may include, but are not limited to, one or more of the following: slots, recesses, tabs, hooks, latches, rails, lips, ferrous material, hook and loop fasteners, and so forth. For example, the front lip 514 may include a steel member. The front engagement features 516 may be able to accept and mechanically engage corresponding features on the front of the modular element.

A slot may comprise an opening in another material. For example, the slot may comprise a hole that has a rectangular, square, elliptical, or other shape. A hook may comprise a member having an asymmetrical shape. For example, a hook may have a shaft with a barb or tip that protrudes perpendicular to a long axis of the hook. The barb or top may mechanically engage a corresponding engagement feature on another member. A tab may comprise a member that protrudes from another structure. In some implementations, the tab may have a ridge or other engagement feature that may mechanically engage a corresponding feature on another member. A bar may comprise a member that has a cross-section that is generally a parallelogram. A rod may comprise a member that is arcuate in cross-section, such as circular or elliptical. A tube may comprise a member that has a cross-section that is generally a parallelogram, arcuate in cross-section, and so forth. For example, the tube may have a circular cross-section.

The engagement features may use magnetic forces to engage two or more members. For example, a magnet may be attracted to another magnet, attracted to a ferromagnetic material, repelled from another magnet, and so forth. The ferromagnetic material may include, but is not limited to, iron, nickel, cobalt, neodymium, and so forth.

In one implementation, the front engagement features 516 may comprise indexing slots. The indexing slots may be oriented vertically such that the corresponding indexing features from a modular element may be inserted from above. For example, the AFU 132 (instrumented or uninstrumented) may include one or more indexing features such as tabs or pegs that slide into the front engagement feature 516 upon installation. For example, an indexing tab may extend from the AFU 132 to engage the front engagement feature. The front engagement features 516 may be configured to provide lateral stability, preventing the modular element from shifting left to right along the width of the platform 130. In some implementations, the front engagement features 516 may not provide for vertical engagement with the indexing features. For example, an indexing feature of the AFU 132 may not "catch" or otherwise be restrained from vertical motion by the front engagement feature 516.

In some implementations, the front lip 514 may incorporate one or more ferrous materials that are attractive to a magnet. In some implementations, the front lip 514 may incorporate one or more magnets. As described below, the magnets may be used to secure the AFU 132 or other modular elements after installation on the platform 130. The magnets may be used to maintain vertical engagement, maintaining a pull between a front of the modular element and the front lip 514. In other implementations, nonmagnetic techniques may be used to retain the front of the modular element to the front lip 514 during operation while maintaining the ability to remove the modular element. For example, a hook and loop fastener, low-tack pressure sensitive adhesive, suction cups, vacuum clamps, and so forth, may be used instead of or in addition to magnets.

Arranged from left to right along the back of the shelf base 506 may be one or more back engagement features 518. The back engagement features 518 may be part of a back wall, extending vertically from a back portion of the shelf base 506. A plurality of back engagement features 518 may be arranged at regularly spaced intervals with respect to one another along the back of the shelf base 506. The back engagement features 518 may include, but are not limited to, one or more of the following: slots, recesses, tabs, hooks, latches, rails, lips, hook and loop fasteners, and so forth. The back engagement features 518 may be horizontally accessible, that is a corresponding feature from a modular element may be inserted in a generally horizontal motion if the shelf base 506 is substantially flat with respect to the Earth. For example, the back engagement features 518 may comprise slots in a back wall extending vertically upward from the shelf base 506, the slots having a longest axis that is perpendicular to a plane described by the shelf base 506. An angle between the back wall and the shelf base 506 may be, within a threshold tolerance, a right angle. The back engagement features 518 may be able to accept and mechanically engage corresponding features on the back of the modular element. For example, the AFU 132 may have tabs that engage the slots.

In some implementations, the back engagement feature 518 may comprise one or more bars, rods, or other members. The modular element may be configured to engage at least a portion of this member. For example, the modular element may be suspended in a cantilever fashion from the back engagement feature 518.

The platform 130 may include one or more internal electronics bays 520. The internal electronics bay 520 may be arranged under the shelf base 506. A perimeter of the internal electronics bay 520 is presented in this illustration as a dotted line. The internal electronics bay 520 may comprise one or more devices. For example, the internal electronics bay 520 may contain one or more of the controllers or other electronics associated with the weight sensors 120(6), one or more computing devices, and so forth. One or more cable harnesses provide communication between the connectors 512 and one or more of the devices within the internal electronics bay 520. The internal electronics bay 520 is described in more detail below with regard to FIG. 6.

One or more platform base supports 404 may also be provided. As described above, platform base supports 404 may be integral with or otherwise part of the platform 130. In some implementations, platform base supports 404 may include a platform base upon which the platform 130 may rest. For example, the shelf base 506, modular elements affixed thereto, and so forth, may be supported from the platform base by the weight sensors 120(6). In some implementations, the internal electronics bay 520 may rest on the platform base or may be mounted to the shelf base 506.

Also depicted in this illustration are cross-sectional lines. A cross section along line A-A is described below with regard to FIG. 6. A cross section along line B-B is described below with regard to FIG. 7.

In a populated second view 504 depicted in this illustration, a number of different modular elements have been affixed to the platform 130. For example, several AFUs 132 have been installed. This installation may include the connection of a data cable (not shown) from the instrumented AFU 132 to one or more of the connectors 512. Adjacent to the AFUs 132 may be dividers 134. The dividers 134 may comprise vertical members extending upwards such as walls that act as partitions between adjacent modular elements. In some implementations, modular elements may incorporate built-in walls or partitions. In another implementation, the divider 134 may comprise wire, tubing, or other features to direct the items 104. For example, the divider 134 may comprise one or more bent wires. To accommodate items 104 that have a width exceeding that of the AFU 132, or to hold items 104 without the use of an AFU 132, a spacer 136 may be employed. To accommodate larger items 104, two or more AFUs 132 may be placed adjacent to one another or may be separated by one or more spacers 136. In some implementations, the two or more AFUs 132 may be instrumented, or one may be instrumented and the other non-instrumented.

The surface of the modular elements may utilize one or more of textures, coatings, or features to facilitate movement of items 104. For example, linear ridge features extending from the front to the back of the modular element may be used to reduce friction between the items 104 and the surface of the modular element to facilitate sliding of the items 104.

The modular elements may be configured to have a common sizing to facilitate the modular operation. A common depth (front-to-back length) of the modular elements may be used. For example, each of the modular elements may have the same depth dimension.

The width of the modular elements may vary. In some implementations, modular elements may vary in width as an integer multiple of a minimum size increment. For example, the minimum size increment may be ⅓ inch with modular elements such as the AFUs 132, the dividers 134, and the spacers 136 available in widths such 1⅓ inch, 2 inches, 2⅔ inches, and so forth.

In other implementations, other modular elements may be used. For example, the other modular elements may include bins, dispensers, hangers, hooks, and so forth.

While the platform 130 has been described in terms of a structure upon which the load such as the modular elements sits, in other implementations, the modular elements may be suspended from the platform 130. For example, the platform 130 may support a plurality of hanger rods or pegs, from which one or more items 104 depend.

Figure 6:
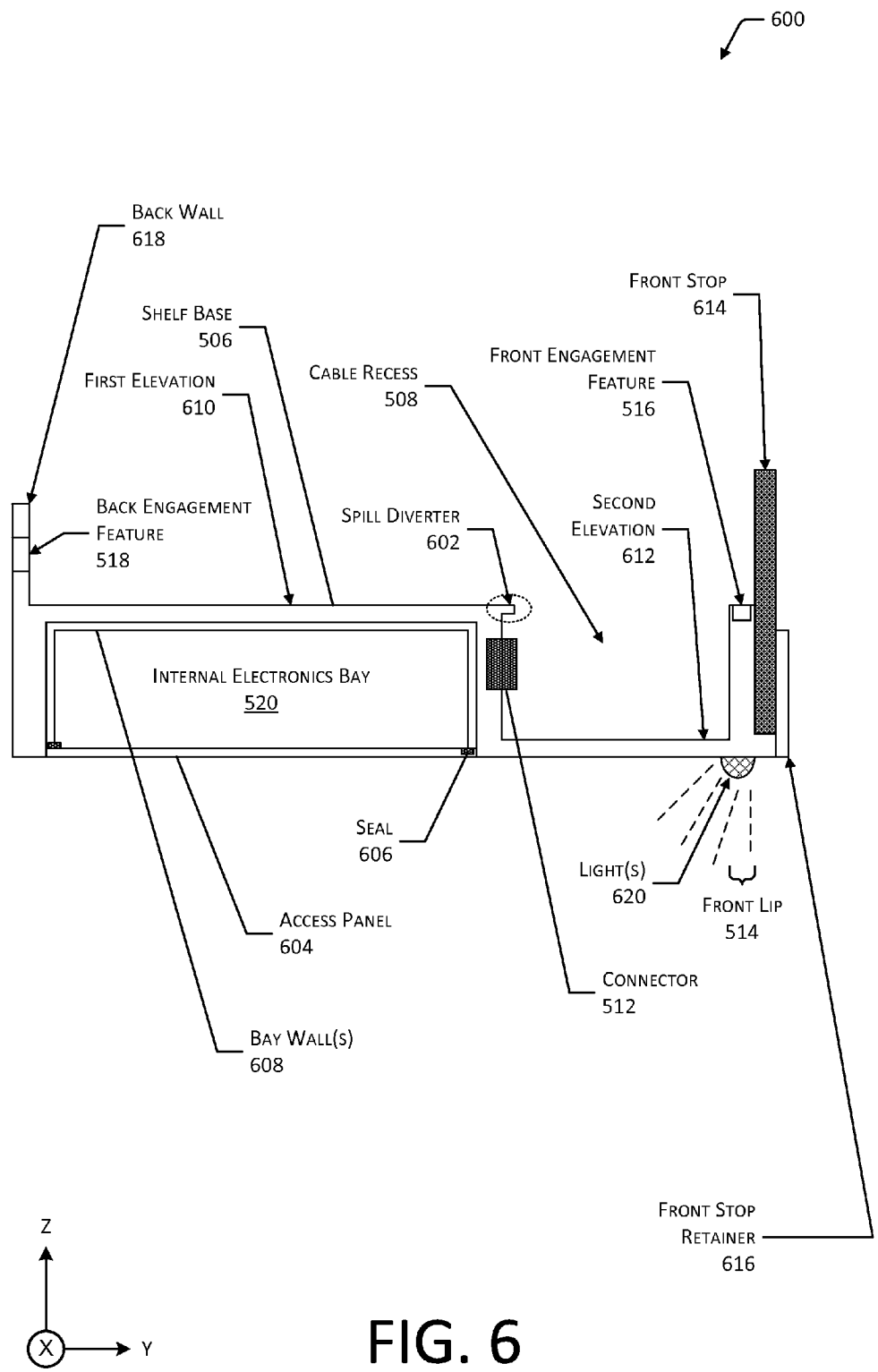
FIG. 6 illustrates a side view of the platform along line A-A depicting various features of the platform including a cable recess, according to some implementations.

FIG. 6 illustrates a side view 600 of the platform 130 along line A-A, according to some implementations.

The platform 130 may include one or more spill diverters 602. The spill diverter 602 may comprise one or more physical features such as a lip, ridge, trough, and so forth, that divert spills of liquids or solids away from one or more of the connectors 512. For example, as illustrated in FIG. 6, the spill diverter 602 comprises an overhang extending away from a vertical face to which the connector 512 is mounted, partially into the cable recess 508 above the connector 512. The extent of the overhang by the spill diverter 602 into the cable recess 508 may be less than, equal to, or greater than the portion of the connector 512 within the cable recess 508. In some implementations, the spill diverter 602 may be contiguous across the width of the shelf base 506 proximate to the cable recess 508. In other implementations, the spill diverter 602 may comprise a plurality of separate features, such as discrete ridges with each ridge associated with a particular connector 512. The spill diverter 602 may be arranged such that a spilled liquid is directed towards one or more of the drains 510.

The internal electronics bay 520 provides a volume within which electronics may be protected from the environment around the platform 130. For example, the internal electronics bay 520 may provide protection from moisture, fluids, dust, and so forth. In some implementations, the internal electronics bay 520 may provide temperature control as well. For example, where the platform 130 is deployed into a refrigerated area, the internal electronics bay 520 may include a heater to maintain a minimum acceptable temperature of the devices within the internal electronics bay 520.

Devices within the internal electronics bay 520 may be accessed by one or more removable access panels 604. In the implementation depicted here, the access panel 604 is arranged along an underside of the platform 130. The access panel 604 may be secured to the platform 130 using one or more mechanical fasteners, latches, magnets, interference fit, and so forth. A seal 606 may be arranged around the interface or junction between a plurality of bay walls 608 and the access panel 604. For example, the seal 606 may comprise silicone rubber, room temperature vulcanizing rubber, and so forth.

The bay walls 608, in conjunction with the access panel 604 (when in place), encompass a sealed volume of the internal electronics bay 520. This sealed volume within the internal electronics bay 520 prevents contaminants such as dust, moisture, and so forth, from affecting the contents of the internal electronics bay 520. Points of entry for cable harnesses or other cabling into the internal electronics bay 520 may be sealed as well.

In some implementations, the bay walls 608 may comprise a portion of the platform 130 structure itself. For example, the shelf base 506 and one or more of the bay walls 608 may be the same piece of material.

As described above, the platform 130 may have elements at different elevations. Depicted here is the shelf base 506 at a first elevation 610. Also depicted is a second elevation 612 of the cable recess 508. As shown, the second elevation 612 of the cable recess 508 is lower than the first elevation 610 of the shelf base 506. While the cable recess 508 is depicted with a flat bottom, in other implementations, other cross sectional shapes may be used. For example, the cable recess 508 may slant downwards from underneath the connector 512 towards the lowest point of the second elevation 612.

A front stop 614 is also shown as part of the platform 130. The front stop 614 may be positioned in front of the front lip 514, such as on a side of the front lip 514 opposite the cable recess 508. The front stop 614 may comprise a removable piece that is retained in place during normal use by a front stop retainer 616. The front stop retainer 616 may be secured to the platform 130 using one or more mechanical fasteners, latches, magnets, interference fit, and so forth. For example, threaded bolts or screws may be used to hold the front stop retainer 616 to the platform 130. The front stop 614 may comprise a plate or planar piece of rigid or semi-rigid material. The front stop 614 may help retain items 104 within the modular elements. For example, the front stop 614 may prevent the items 104 held by the AFU 132 from being pushed off of the AFU 132 and onto the floor below. In some implementations, the front stop 614 or another structure may be configured to support one or more labels, tags, or other displays for presenting information to the users 116 of the facility 102.

One or more lights 620 may be arranged on an underside of the platform 130. These lights 620 may include LEDs, incandescent lights, fluorescent lights, electroluminescent lights, quantum dots, lasers, and so forth. The lights 620 may provide illumination for objects below the platform 130. For example, the lights 620 may illuminate items 104 on the modular elements below. The lights 620 may be positioned proximate to the front of the platform 130. The lights 620 may be configured to direct emitted light, such as down and towards the back of the inventory location 114 below, such as another platform 130. The lights 620 may include optical elements such as reflectors, lenses, light pipes, and so forth, to provide desired illumination.

Figure 7:
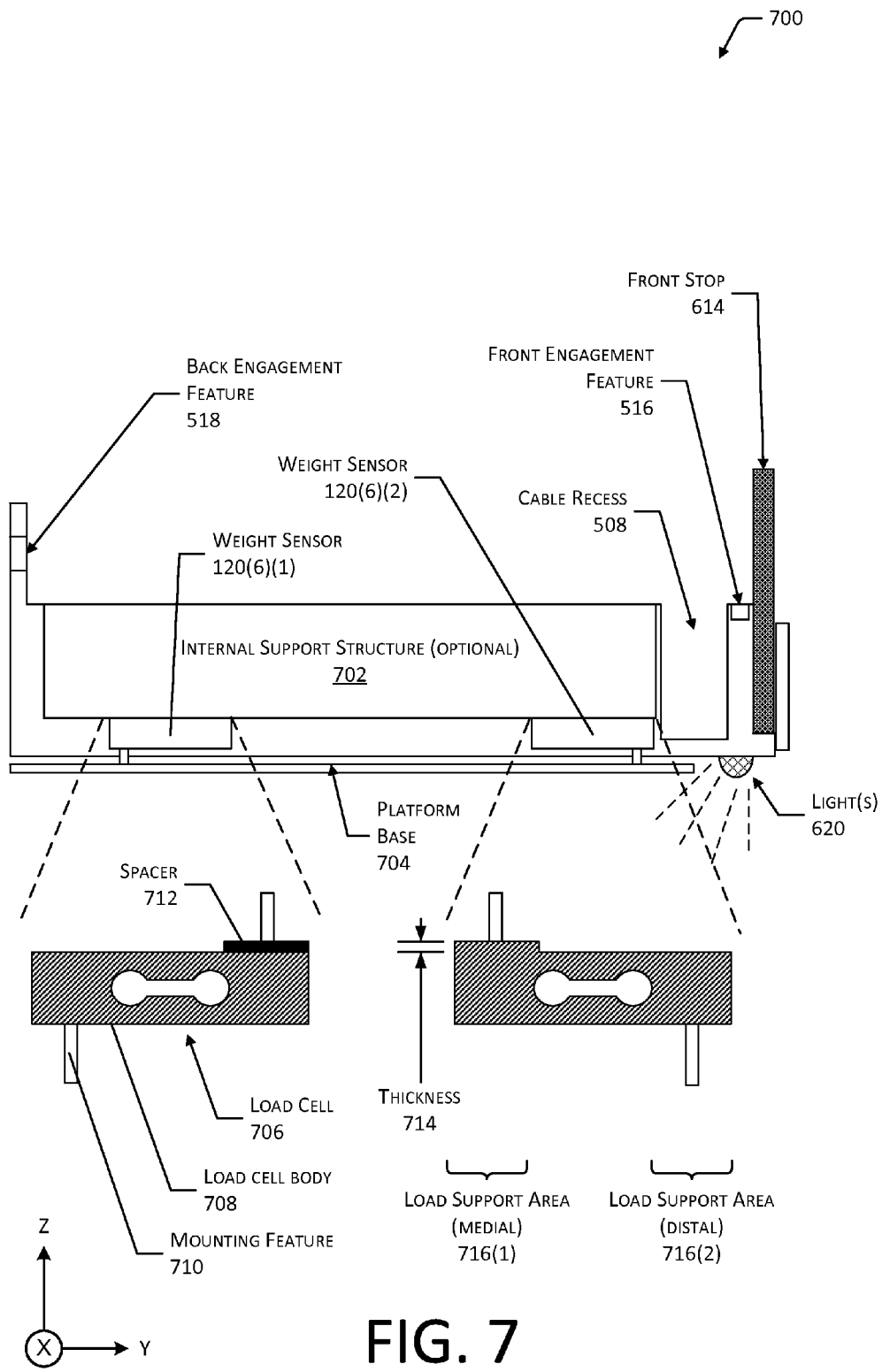
FIG. 7 illustrates a side view of the platform along line B-B depicting various features of the platform including weight sensors, according to some implementations.

FIG. 7 illustrates a side view of the platform 130 along line B-B, according to some implementations. Along the line B-B are the weight sensors 120(6)(1) and 120(6)(2) arranged underneath the shelf base 506. In the implementation depicted here, an internal support structure 702 is depicted that provides support between the shelf base 506 and the weight sensors 120(6). For example, the internal support structure 702 may comprise one or more "C" channel rails that support the shelf base 506 and transfer a mechanical load from the shelf base 506 to the weight sensors 120(6). In some implementations the internal support structure 702 may be optional. For example, the weight sensors 120(6) may directly support the shelf base 506.

The platform 130 may rest upon a platform base 704. For example, the platform base 704 may be affixed to the platform base supports 404. Continuing the example, the platform base 704 and a platform base supports 404 may comprise a shelf upon which the platform 130 rests. The weight sensors 120(6) act as an interface between the platform 130 and the platform base 704, transferring the weight of the platform 130 and a load thereupon to the platform base 704.

The weight sensors 120(6) may include a load cell 706. The load cell 706 may include a load cell body 708. The load cell body 708 may comprise a structure or material that, under the influence of an applied force such as the weight of a load thereupon, will deflect or bend. In some implementations, such as shown here, cutouts or voids may be provided within the load cell body 708. The load cell body 708 may include, or have affixed thereto, a transducer such as a strain gauge to measure the extent of the deflection. In other implementations, the load cell body 708 itself may comprise a transducer material such that distortion or deflection due to an imposed load generates a detectable signal that may be used to determine an applied weight.

One or more mounting features 710 may be used to retain the load cell 706 to the platform 130 and the platform base 704. For example, the mounting feature 710 may include one or more pins, bolts, threaded sockets, and so forth. Continuing the example, a mounting feature 710 on the underside of the load cell 706 at the interface between the load cell 706 and the platform base 704 may comprise a foot to rest upon the platform base 704 or a bolt to pass through the corresponding hole in the platform base 704 and be retained with a nut.

A spacer 712 having a thickness 714 is placed between the load cell 706 and the corresponding mating surface of the platform 130. The mounting feature 710 such as a bolt or pin through the spacer 712 may maintain the position of the spacer 712 and also affix the load cell 706 to the platform 130.

The spacer 712 provides a gap or standoff between the load cell 706 and the rest of the platform 130. For example, the spacer 712 may be used to maintain a gap of thickness 714 between a top of the load cell 706 and the bottom of the internal support structure 702 when the platform 130 is in a base load or unpopulated state. The spacer 712 may comprise a separate piece, such as a discrete piece of metal, plastic, ceramic, and so forth. In other implementations, the load cell body 708 may be formed, machined, or otherwise designed such that the spacer 712 is integrated thereto. For example, a first end of the load cell body 708 may be stepped or thicker than a second end. During use, as modular elements and items 104 are added to the platform 130, the weight on the platform 130 and on the respective load cells 706 increases.

The thickness 714 of the spacer 712 may be configured such that overloading the platform 130 with too much weight will result in the load cell 706 "bottoming out" before there is irreparable damage to the load cell body 708 or the other components of the load cell 706. For example, the load cell 706 may be described as having two load support areas 716. A first load support area 716(1) of each load cell 706 is positioned medially, that is on an end of the load cell 706 that is closest to the neighboring load cell 706. The first load support area 716(1) may be the point at which a mounting feature 710 and the spacer 712 transfer the weight of a load from the platform 130 to the load cell 706. A second load support area 716(2) is distal from the first load support areas 716(1) and the neighboring load cell 706. The second load support area 716(2) transfers the weight of the load from the load cell 716 to the platform base 704.

During normal operation, the weight of the load on the load cell 706 such as the weight of the platform 130 and any modular elements thereupon is applied to the first load support area 716(1). The load cell body 708 may undergo a slight deformation or change in shape that is detectable and may be used to determine a numeric value of the weight. The force of the weight then passes through the load cell body 708 to the second load support area 716(2) and onto the platform base 704. During an overload condition, the upper surface of the load cell body 708 at the second load support area 716(2) may come in contact with the internal support structure 702, shelf base 506, or other structure to which the upper mounting feature 710 of the load cell 706 is affixed. The thickness 714 of the spacer 712 allows sufficient travel for the distal end of the load cell body 708 to be displaced, provide for measurement of a desired range of weights, while preventing excessive travel that may result in irreparable damage to the load cell 706. The spacer 712 that provides a safety mechanism to avoid damaging load cell 706 should a user 116 inadvertently overload the platform 130.

In other implementations, other configurations of load cell 706 may be used. For example, the load cell 706 may be configured as a single-ended beam, double-ended beam, S-beam, and so forth.

The weight sensors 120(6) may be readily accessible and field replaceable. For example, weight sensors 120(6) incorporating load cells 706 having different weight ranges or capacities may be readily changed out to accommodate different types of loads. Continuing the example, where the platform 130 will be supporting modular elements holding items 104 that are heavy such as canned foods, load cells 706 and spacers 712 designed for the estimated total load of the platform 130 may be installed in the platform 130. In comparison, where the platform 130 will be supporting items 104 that are lighter, such as potato chips, different load cells 706 and spacers 712 may be installed in the platform 130. The weight sensors 120(6) may be selected to provide a particular operating range such as a minimum weight, maximum weight, desired weight resolution, and so forth, as desired by operators of the facility 102.

Figure 8:
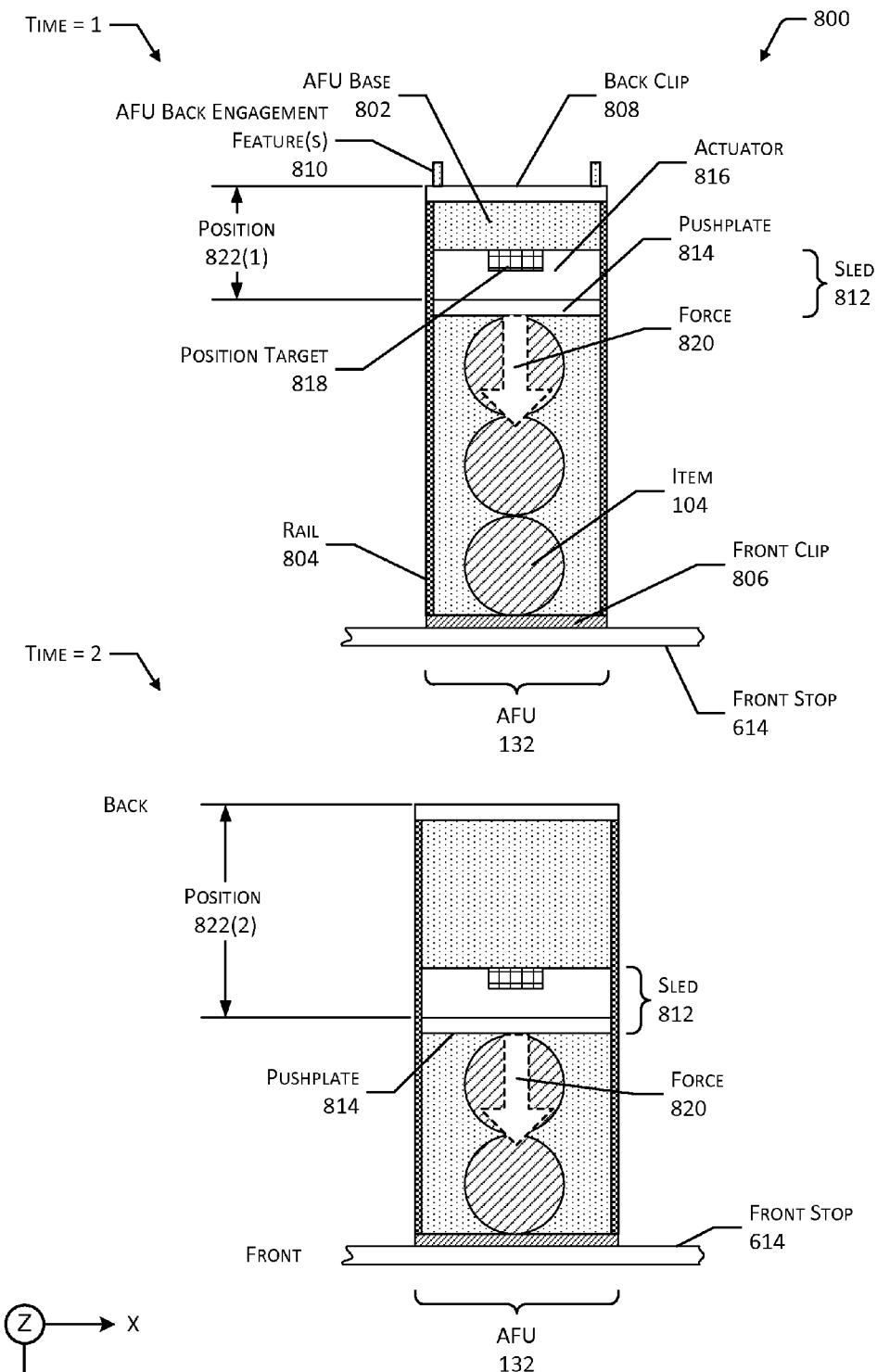
FIG. 8 illustrates top views of an instrumented auto-facing unit, according to some implementations.

FIG. 8 illustrates top views 800 of an instrumented AFU 132, according to some implementations. The AFU 132 may be instrumented to provide sensor data 128 that may be used to determine information such as quantity of items 104 held by the instrumented AFU 132.

The AFU 132 may include an AFU base 802. One or more items 104 that may be stowed by the AFU 132 may sit upon the AFU base 802. One or more rails 804 may be integral with, or affixed to, the AFU base 802. For example, two rails 804 may be used as illustrated here, with each rail 804 on an opposite side of the AFU base 802.

A front clip 806 is arranged at a front of the AFU base 802 proximate to a front end of the rails 804. As described below in more detail, the front clip 806 may constrain the travel of the sled towards the front of the AFU base 802. The front clip 806 may have one or more mechanical engagement features that retain the front clip 806 to the AFU base 802. For example, the front clip 806 may have one or more ridges or tabs that engage corresponding slots within the AFU base 802.

A back clip 808 is arranged at a back of the AFU base 802 proximate to a backend of the rails 804. As described below in more detail, the back clip 808 may constrain the travel of the sled towards the back of the AFU base 802. The back clip 808 may have one or more mechanical engagement features that retain the back clip 808 to the AFU base 802. For example, the back clip 808 may have one or more ridges or tabs that engage corresponding slots within the AFU base 802.

Extending from a back of the AFU base 802 or other portion of the AFU 132 may be one or more AFU back engagement features 810. The AFU back engagement features 810 are configured to engage one or more of the back engagement features 518 of the platform 130. In some implementations, the AFU back engagement features 810 may extend from the back of the AFU 132.

A sled 812 comprises an assembly that is movable relative to the AFU base 802. The sled 812 may include one or more features that are engaged by the rail 804. The sled 812 may travel linearly from front to back of the AFU base 812 as constrained by the front clip 806 and the back clip 808. The one or more rails 804 retain the sled 812 with respect to the AFU base 802.

The sled 812 may include a pushplate 814, an actuator 816, and the position target 818. The pushplate 814 comprises a member that comes in contact with one or more items 104 that may be stowed by the AFU 132. The pushplate 814 may comprise a member having a substantially flat, curvilinear, or other shape with a long axis generally perpendicular to the AFU base 802.

The actuator 816 may comprise one or more of a spring or motor. In this illustration, the actuator 816 is depicted as being located on the sled 812. In other implementations, the actuator 816 may be positioned within AFU base 802, the front clip 806, or another portion of the AFU 132. The actuator 816 is configured to apply a force 820 to the sled 812 such that the sled 812 is biased to move towards the front clip 806. The actuator 816 may comprise a linear motor, rotary motor, and so forth. For example, a linear or rotary motor may be used to move the sled 812 towards or away from the front of the AFU base 802.

The force 820 provided by the actuator 816 may be sufficient to push one or more of the items 104 that are on the AFU base 802 towards the front stop 614. For example, the actuator 816 may comprise a variable force spring with one end attached to the sled 812 and the other attached to one or more of the front of the AFU base 802 or the front clip 806. In one implementation, a portion of the variable force spring may be bent, with the bent portion engaging a portion of the front clip 806, such as an edge of a slot. In another implementation, the variable force spring may be riveted, screwed, glued, laminated, or otherwise affixed to the front clip 806.

Under the influence of the actuator 816 that produces the force 820, as items 104 are added to or removed from the AFU base 802, the sled 812 moves towards or away from the front clip 806. Position data may be generated by a position sensor 120(13) within the instrumented AFU 132 that is indicative of a position 822 of the sled 812. The position 822 may be relative to a particular origin or a reference point on the instrumented AFU 132, such as the rearmost portion of the back clip 808 as illustrated here. In other implementations, other origins or reference points may be used, such as a front of the AFU base 802, relative to the position sensor 120(13) itself, and so forth. The position 822 and the corresponding position data may be represented in terms of a binary value, absolute measurement, and so forth. For example, the position 822 may be represented as a four bit value, distance in inches, and so forth.

In this illustration, at time=1, three items 104 are shown stored by the instrumented AFU 132. For example, the position 822(1) is indicative of first position data such as "1 inch". At time=2, one item 104 has been removed, leaving two items 104 still stowed by the instrumented AFU 132. As a result of the force 820 applied by the actuator 816, the sled 812 has moved to a new position 822(2). Continuing the example, the position 822(2) is indicative of second position data such as "4 inches". The controller device onboard the instrumented AFU 132, or another device such as the server 204, may process sensor data 128 indicative of one or more of the first position 822(1), the second position 822(2), or a difference between the two (such as "+3 inches"). Based on the sensor data 128 providing information about one or more of the change in position 822, the magnitude of the change in position 822, the sign of the change in position 822, speed of change in position 822, and so forth, information indicative of an interaction with the items 104 stowed by the instrumented AFU 132 may be determined. For example, based on the change in position of 3 inches, the item data 126 indicative of the depth of the type of item 104 stowed by the instrumented AFU 132 being 3 inches each, and a positive sign of the difference, the processing module 328 may determine that a quantity of one of the items 104 stowed by the AFU 132 has been picked.

The position target 818 is detectable by a position sensor located within or underneath the AFU base 802. The position target 818 may comprise an active or passive component. An active component may use a battery or electrical energy received via wires to generate a signal. For example, an infrared emitter is an active component. In comparison, a passive component may interact with a signal produced by detector. For example, passive component may comprise an inductive target. The position target 818 and its interaction with the position sensor 120(13) are discussed in more detail below with regard to FIG. 9.

While the AFU 132 is described in terms of discrete components, in some implementations, a single structure may be used instead of discrete components. For example, the front clip 806, the rails 804, the AFU base 802, and the back clip 808 may comprise a single piece or structure that is formed, milled, or otherwise fabricated. Likewise, the sled 812 may comprise a single piece or structure.

Figure 9:
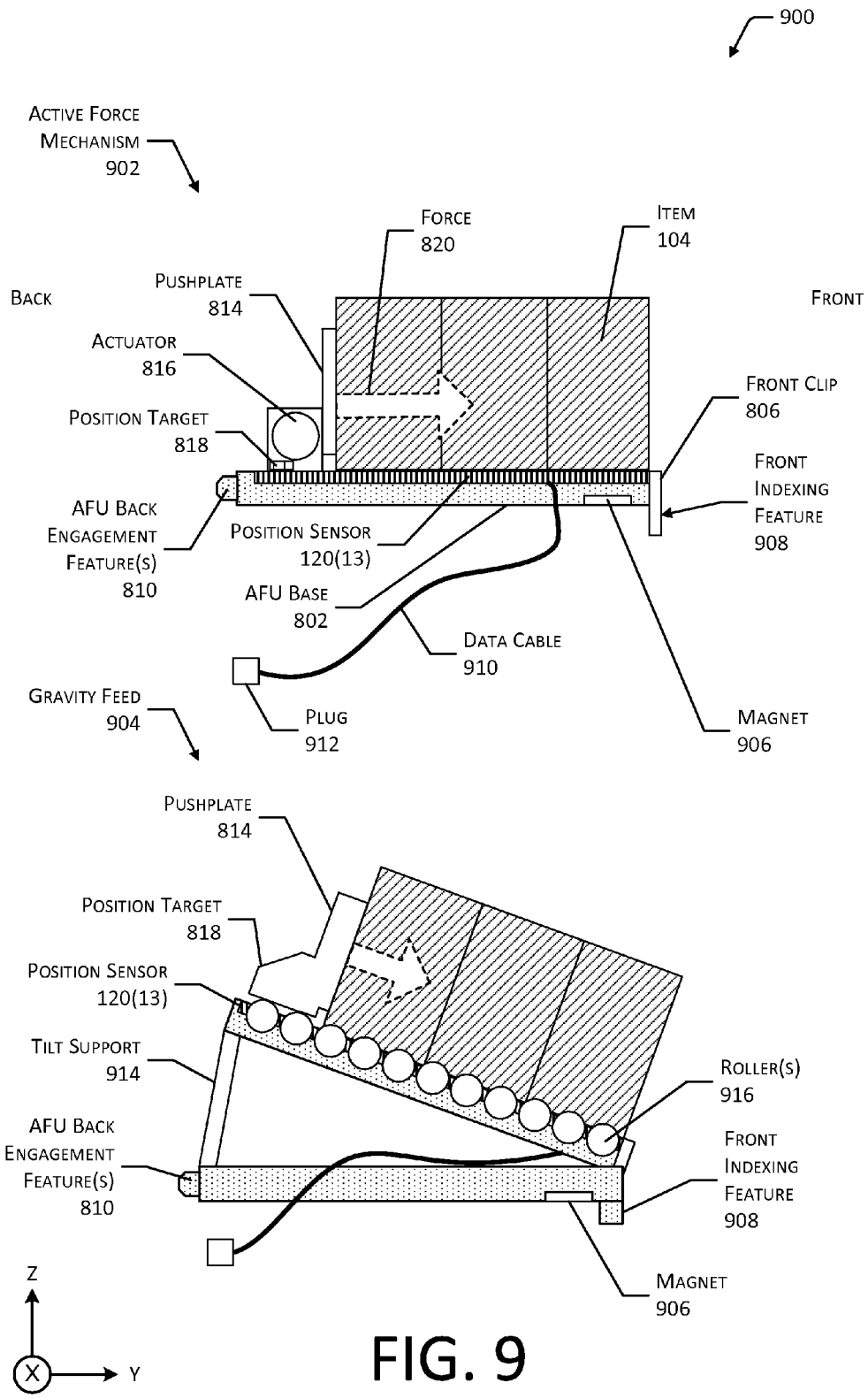
FIG. 9 illustrates side views of the instrumented auto-facing unit, according to some implementations.

FIG. 9 illustrates side views 900 of different versions of the instrumented AFUs 132, according to some implementations. At 902, an active force mechanism version of the instrumented AFU 132 is depicted. At 904, a gravity feed version of the instrumented AFU 132 is depicted. As FIG. 9 depicts different versions of the instrumented AFUs 132, portions of the platform 130, such as the front stop 614, are not presented.

With regard to the active force mechanism version at 902, several features are designed to assist in the mounting of the AFU 132 to the platform 130. One or more engagement features such as magnets 906 may be placed proximate to a front end of the AFU base 802. The one or more magnets 906 may be located on an underside of the AFU base 802, on an upper side of the AFU base 802, or within the AFU base 802. When installed at the platform 130, the magnet 906 is attracted to a ferrous material or another magnet positioned within the front lip 514. The attraction of the magnet 906 to the front lip 514 or other portion of the shelf base 506 provides a force to retain the AFU base 802 in position, with respect to the shelf base 506, during use. For example, as a user 116 pushed to insert or remove items 104 from the AFU 132, the magnet 906 keeps the front of the AFU base 802 from tipping upwards.

In other implementations, other engagement features including, but not limited to, hook and loop fasteners, low-tack pressure sensitive adhesives, suction cups, vacuum clamps, a portion of a spring from the actuator 816, and so forth, may be used instead of or in addition to magnets 906. For example, a portion of the spring from the actuator 816 may have one or more bends or features therein that are configured to engage into a corresponding engagement feature in the front lip 514. Continuing the example, the front end of the spring from the actuator 816 may be bent to form a ridge that may then engage a slot within the front lip 514. The magnet 906 or other mechanism provides a force that retains the front of the AFU 132 in contact with the front lip 514.

One or more front indexing features 908 may be proximate to the front of the AFU 132. In some implementations, one or more of the front indexing features 908 may extend from or be integral with the front clip 806. The front indexing feature 908, when engaged with the front engagement features 516 of the front lip 514, may be configured to provide lateral stability to prevent the AFU 132 from shifting left to right along the width of the platform 130. The front indexing feature 908 may comprise a member extending downwards perpendicularly from the front of the AFU base 802, the front clip 806, or another portion of the AFU 132. In some implementations, the front indexing feature 908 may not provide for vertical engagement with the indexing features. For example, the front indexing feature 908 may comprise a smooth sided tab of a constant cross section. When engaged, the front indexing feature 908 prevents lateral motion of the front end of the AFU 132.

One or more position sensors 120(13) may be incorporated into the instrumented AFU 132. The position sensor 120(13) provides information indicative of a position of one or more of items 104, the sled 812, the position target 818 held by the sled 812, and so forth. The position sensor 120(13) may use optical, magnetic, capacitive, inductive, or other techniques to determine presence of an object. For example, the position sensor 120(13) may comprise a resonant inductive position sensor such as the 205 mm Type 6.8 Linear Sensor provided by Cambridge Integrated Circuits Ltd. Of Cambridge, United Kingdom. This position sensor uses a plurality of sensor coils mounted to a printed circuit board that detect the presence of an inductive resonator that acts as the position target 818. For example, the position target 818 may comprise an inductive resonator element, such as a coil, having a resonant frequency. The position sensor 120(13) may include an exciter coil to generate a magnetic field at the resonant frequency. The position sensor 120(13) may also include a plurality of sensor coils. During operation, the exciter coil emits a magnetic field that induces an electromotive force (EMF) in the inductive resonator element. This EMF then produces a signal that may be detected by sensor coils. A processor or controller may then determine proximity of the position target based on strength of the signal at the plurality of sensor coils, and given the known location of and distance between the sensor coils. The processor may then generate sensor data 128 indicative of the relative position of the sled 812.

In one implementation, the position sensor 120(13) may comprise a linear array of inductive sensors. The inductive sensors may be configured to emit an electromagnetic signal that interacts with the position target 818. When a particular inductive sensor of the linear array detects a signal corresponding to position target 818, the position 822 may be determined as corresponding to that of the particular inductive sensor. In another implementation, the position sensor 120(13) may comprise a linear array of Hall effect sensors or other sensors able to detect a magnetic field. The position target 818 may comprise a magnet, with the magnetic field produced by that magnet detectable by the sensors in the linear array. In yet another implementation, the position sensor 120(13) may comprise optical emitters, optical transmitters, and so forth. For example, an infrared LED may provide illumination while infrared photodiodes are used to detect a particular light pattern reflected by the position target 818, underside of the sled 812, and so forth.

In other implementations, an active portion of the position sensor 120(13) may be located on the sled 812. For example, optically detectable targets such as a barcode may be printed on or otherwise arranged on an upper surface of the AFU base 802. An optical transceiver comprising an infrared LED and an infrared photodiode may be configured to detect the barcode and determine position information based on information encoded therein. In another implementation, an optoelectronic sensor comprising a low-resolution two-dimensional array of monochromatic detectors and a light emitter may be used to detect motion and distance traveled.

It is recognized that a wide variety of other mechanisms may be used to measure the relative displacement of the sled 812 with respect to the AFU base 802.

A data cable 910 that is terminated in a plug 912 may be used to couple the electronics of the position sensor 120(13) to one or more of the connectors 512 within the cable recess 508 of the platform 130. The data cable 910 may be used to transfer the sensor data 128 to an external device, such as a computing device in the platform 130. The data cable 910 may exit the AFU base 802 in approximately a front half or front third of the AFU base 802. For example, the exit point for the data cable 910 from the AFU base 802 may be arranged to correspond with the cable recess 508 when the instrumented AFU 132 is installed onto the platform 132.

In some implementations, the data cable 910 may be omitted, and a connector 512 may be provided within the front lip 514. In such an implementation, the cable recess 508 may be omitted from the platform 130. In other implementations, the data cable 910 or similar physical interconnects may be omitted. For example, the position sensor 120(13) may provide the resulting sensor data 128 wirelessly. The components of the position sensor 120(13) that use electrical power may receive power wirelessly. In other implementations, power may be provided from one or more conductive rails or features arranged at one or more of the front lip 514, such as within the front engagement features 516, the back engagement feature 518, and so forth. In yet another implementation, the position sensor 120(13) or other components of the instrumented AFU 132 may be powered by batteries, capacitors, photovoltaic cells, thermocouples, kinetic energy harvesting devices, and so forth. For example, movement of the sled 812 may be used to generate electrical energy that powers the position sensor 120(13) or other components.

While the modular element may couple to the connectors 512 in the shelf base 506, in some implementations the modular elements may be daisy-chained. For example, a first data cable 910 of a first modular element may connect to a connector on a second modular element. The second modular element may then connect to one of the connectors 512 using a second data cable 910. The first modular element may perform one or more data processing functions, or may pass through any signals or data between the devices in the shelf base 506 and the second modular element.

In some implementations, one or more of the components within the instrumented AFU 132 may be sealed or held in place using a potting compound. For example, epoxy may be placed within the AFU base 802 to seal and retain components such as the position sensor 120(13), the magnet 906, a portion of the data cable 910, and so forth. Portions of the AFU base 802 or other components may include integrated features such as ridges that are produced during manufacture. These features may act as dams to retain the potting compound while in its liquid state during manufacture.

With regard to the gravity feed version 904, the actuator 816 may be omitted. Instead, a tilt support 914 may maintain the AFU base 802 at an angle. For example, the AFU base 802 may have a first elevation at the front and a second elevation at the back, with the second elevation being higher than the first elevation. The AFU base 802 may include one or more rollers 916 to facilitate movement of the items 104 towards a front of the AFU base 802. The weight of the items 104 and the weight of the sled 812 may provide the force 820 in this version. In some implementations of this version, the sled 812 may include additional mass to increase the force 820.

Figure 10:
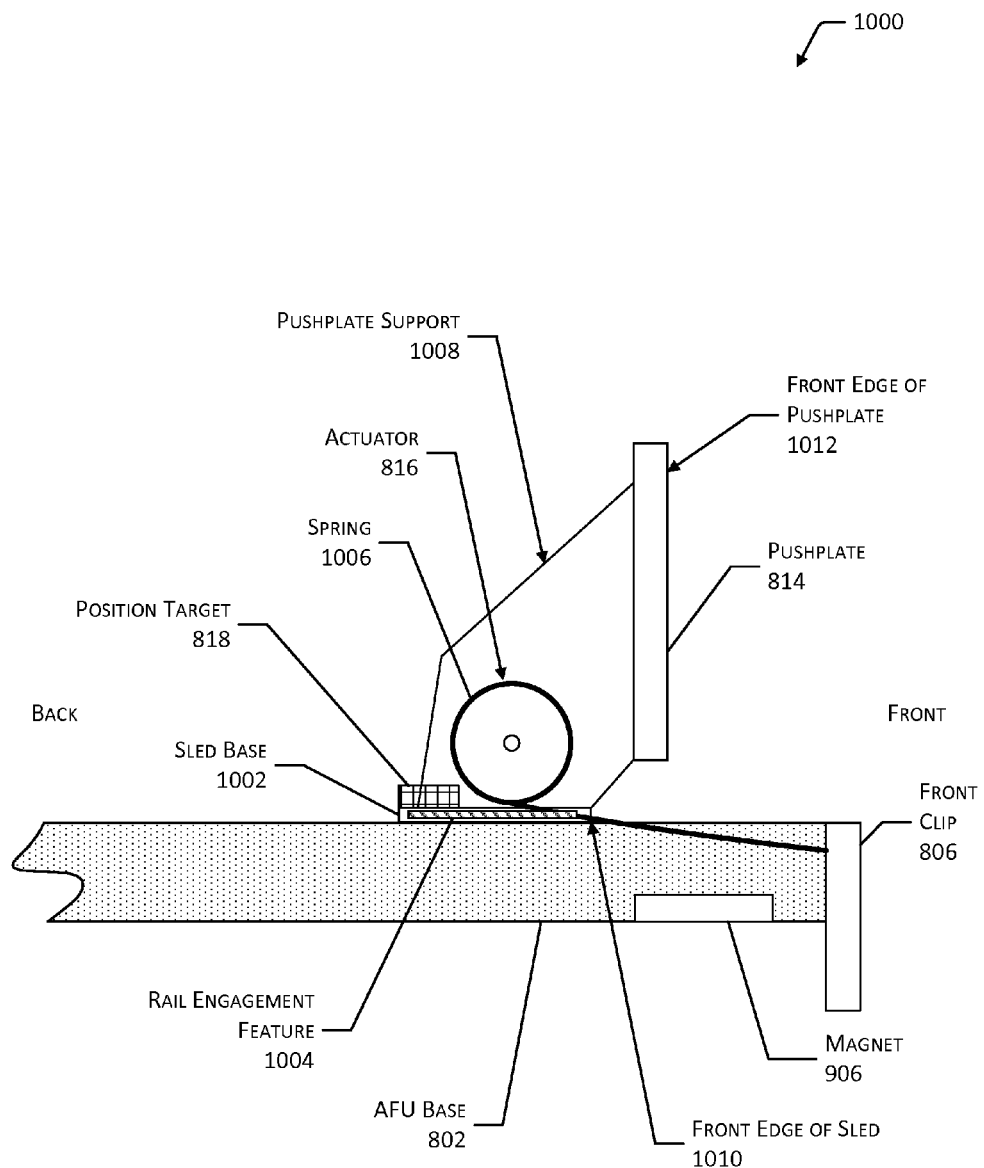
FIG. 10 illustrates a side view of a portion of the instrumented auto-facing unit, according to some implementations.

FIG. 10 illustrates a side view 1000 of the sled 812 of the instrumented AFU 132, according to some implementations. As described above, the sled 812 may include a pushplate 814, an actuator 816, and a position target 818. These components may be mounted or otherwise secured to a sled base 1002. The sled base 1002 may include one or more rail engagement features 1004. The rail engagement features 1004 assist in maintaining the sled 812 proximate to the AFU base 802 during operation. The rail engagement features 1004 may comprise ridges or protrusions that mechanically engage one or more sides of the rails 804. For example, the ridges may mechanically engage an upper face and a lower face of the rails 804. The rail engagement features 1004 in combination with the rails 804 may constrain motion of the sled 812 along a single axis.

In this illustration, the actuator 816 comprises spring 1006. For example, the spring 1006 may comprise a stainless steel spring having one end affixed to a portion of the sled 812 and the other end affixed to the front of the AFU base 802 or the front clip 806. In some implementations, the spring 1006 may engage a front of the AFU base 802 and the front clip 806 may hold the spring 1006 in place to maintain that engagement. In some implementations, the spring 1006 may be dismountable from the front clip 806. By being readily dismountable, such as without tools or with simple tools, changing of springs 1006 that have become worn or broken is performed more easily. Spring 1006 may also be changed to provide a different level of force 820 at the AFU 132, and so forth. For example, an AFU 132 holding heavy items 104 may need a more forceful spring 1006 than another AFU 132 holding lightweight items 104.

In other implementations, the actuator 816 may be arranged in other positions. For example, the actuator 816 may be located within the AFU base 802, within or affixed to the platform 130, and so forth.

One or more pushplate supports 1008 extend from the sled base 1002 to the pushplate 814. The sled base 1002, the pushplate support 1008, and the pushplate 814 may comprise one or more different mechanical elements. For example, a single structure may be formed that incorporates all three elements.

The pushplate support 1008 may be configured to maintain a front edge of the pushplate 1012 at a point which is forward of a front edge of the sled 1010. During operation of the AFU 132, if the front stop 614 is removed, the front edge of the pushplate 1012 may extend past the front clip 806. Said another way, if the front clip 806 is removed, the spring 1006 and the arrangement of the front edge of the pushplate 1012 may be such that all items 104 that are stowed by the AFU 132 would be pushed clear of the AFU base 802 and onto the floor.

In some implementations, the pushplate 814 may be removable or may have additional elements affixed thereto. For example, the pushplate 814 may be removable from the pushplate support 1008 to enable use of a pushplate 814 that has a larger area, smaller area, particular contour, particular height, particular width, and so forth. For example, a large pushplate 814 may be installed to the pushplate support 1008 to accommodate bulky products.

The other modular elements may include one or more of the features described above with regard to the AFU 132. For example, the dividers 134, spacers 136, or other modular elements may include engagement features, particular surface textures or treatments, and so forth.

Other implementations may be used in the facility 102. For example, the magnet 906 may be proximate to the back of the modular element rather than the front, and the various engagement features may be flipped to correspond. Continuing the example, the indexing feature may be positioned at the back of the AFU 132, while engagement features are located at the front of the AFU 132.

In some implementations, the position sensors 120(13) may be within the platform 130. For example, a plurality of position sensors 120(13) may be arranged in lanes. A modular unit may then be attached to the platform 130. In one variation of this implementation, the platform 130 may include a shelf base 506 configured with engagement features to hold other elements, such as the sled 812. For example, the shelf base 506 may include a plurality of rails 804 or similar features onto which the sled 812 may be engaged at a desired location. The position sensors 120(13) in the platform 130 may determine the position of a sled 812 or position target 818 therein.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art. Additionally, those having ordinary skill in the art readily recognize that the techniques described above can be utilized in a variety of devices, environments, and situations.

Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
 a platform having a front and a back, the platform including:
  a plurality of weight sensors to measure weight distribution of a load on a shelf base;
  a plurality of back engagement slots arranged along the back of the platform;
  a cable recess including one or more connectors;
  a plurality of front engagement slots arranged along the front of the platform; and
 a first modular element to mount to the platform by engaging one or more of the plurality of back engagement slots and one or more of the plurality of front engagement slots, the first modular element including one or more of:
  an auto-facing unit to hold one or more items; or
  an instrumented auto-facing unit to hold the one or more items and including a data cable terminated in a plug to couple to one of the one or more connectors.

2. The system of claim 1, wherein
the first modular element comprises a first instrumented auto-facing unit mounted to the platform and having a first data cable plugged into a first of the one or more connectors; and
further comprising:
a second modular element comprising a second instrumented auto-facing unit mounted to the platform and having a second data cable plugged into a second of the one or more connectors, wherein the first modular element and the second modular element have a common depth from front to back and different widths.

3. The system of claim 1, further comprising:
an upright support member with a plurality of slots; and
a platform base to support the platform, the platform base including:
 a first set of one or more engagement features to engage one or more of the plurality of slots in the upright support member, and
 a second set of one or more engagement features to engage one or more of the plurality of weight sensors of the platform.

4. A system comprising:
a platform including:
 a plurality of weight sensors to measure weight of a load on the platform;
 at least one engagement feature along at least a portion of a width of the platform; and
 a first modular element mounted to the at least one engagement feature, the first modular element to hold one or more items and the first modular element comprising one or more sensors.

5. The system of claim 4, further comprising a controller to:
determine one or more first weight values from the weight of the load measured by the plurality of weight sensors;

determine a change in weight of the load associated with mounting the first modular element to the platform that is empty of the one or more items; and determine one or more tare weight values of the load on the platform including the empty first modular element.

6. The system of claim 4, the at least one engagement feature including one or more of:
a slot,
a hook,
a tab,
a bar,
a rod,
a tube,
a ferrous material, or
a magnet.

7. The system of claim 4, the first modular element comprising an instrumented auto-facing unit including
a sled to push the one or more items to a front of the instrumented auto-facing unit; and
wherein the one or more sensors include a linear position sensor to report a value indicative of a position of the sled relative to the instrumented auto-facing unit, wherein the value is represented by one or more of:
an analog signal wherein amplitude of the analog signal is indicative of the position, or
a digital signal in which one or more bits of data are indicative of the position.

8. The system of claim 4, wherein the first modular element extends from a front of the platform to a back of the platform;
wherein the at least one engagement feature comprises slots along the back of the platform and magnets along the front of the platform; and
wherein the first modular element mounts to the platform by engaging one or more of the slots and one or more of the magnets.

9. The system of claim 4, wherein a width of the first modular element is a first integer multiple of a minimum dimension; and
the system further comprising a second modular element mounted to the at least one engagement feature, wherein a width of the second modular element is a second integer multiple of the minimum dimension.

10. The system of claim 4, further comprising:
a second modular element mounted to the platform adjacent to the first modular element, wherein the second modular element is a flat spacer to cover a portion of the platform from a front of the platform to a back of the platform.

11. The system of claim 4, further comprising:
a second modular element mounted to the platform adjacent to the first modular element, the second modular element including a divider extending upwards to maintain the one or more items held by the first modular element separate from an adjacent modular element on a side opposite the first modular element, wherein the divider comprises one or more solid sheets, wires, or slats.

12. A system comprising:
a platform including:
a plurality of weight sensors to measure weight of a load on the platform;
a first plurality of engagement features along at least a portion of a width of the platform at a first elevation, the first plurality of engagement features to engage one or more modular elements;
a cable recess arranged proximate to a front of the platform and with a second elevation below the first elevation; and
at least one electrical connector arranged within the cable recess.

13. The system of claim 12, further comprising:
a first modular element to hold one or more items, the first modular element mounted to the platform using at least a portion of the first plurality of engagement features.

14. The system of claim 13, wherein a width of the first modular element is a first integer multiple of a minimum dimension; and
the system further comprising a second modular element mounted to the platform using at least a second portion of the first plurality of engagement features, wherein a width of the second modular element is a second integer multiple of the minimum dimension.

15. The system of claim 13, the first modular element comprising:
one or more sensors to generate sensor data; and
a cable extending from an underside of the first modular element, wherein a first end of the cable is affixed to the first modular element at a front half of a base and a second end of the cable terminates in a plug to engage the at least one electrical connector and transfer the sensor data between the one or more sensors and one or more devices in the platform.

16. The system of claim 12, wherein the cable recess contains at least one incursion having at least one of the plurality of weight sensors emplaced within the incursion.

17. The system of claim 12, further comprising a platform base; and wherein the platform is supported above the platform base using the plurality of weight sensors.

18. The system of claim 12, further comprising:
a first modular element mounted to the platform using at least a first portion of the first plurality of engagement features, wherein the first modular element is a first flat spacer having a first width and covering a first portion of the platform from a front of the platform to a back of the platform; and
a second modular element mounted to the platform using at least a second portion of the first plurality of engagement features, wherein the second modular element is a second flat spacer having a second width and covering a second portion of the platform from the front of the platform to the back of the platform.

19. The system of claim 12, further comprising:
a first modular element to hold one or more items, the first modular element mounted to the platform using at least a portion of the first plurality of engagement features; and
a second modular element having a divider extending upwards to constrain movement of the one or more items held by the first modular element, wherein the divider comprises one or more solid sheets, wires, or slats.

20. The system of claim 12, the first plurality of engagement features including one or more of:
a slot,
a hook,
a tab,
a bar,
a rod,
a tube,
a ferrous material, or
a magnet.

21. A system comprising:
a platform including:
- a plurality of weight sensors to measure weight distribution of a load on a shelf base;
- a plurality of back engagement slots arranged along the back of the platform;
- a cable recess including one or more connectors;
- a plurality of front engagement slots arranged along the front of the platform; and
- a first modular element to mount to the platform by engaging one or more of the plurality of back engagement slots and one or more of the plurality of front engagement slots, the first modular element including one or more sensors to generate sensor data and a data cable terminated in a plug to couple to one of the one or more connectors and transfer the sensor data.

* * * * *